(12) United States Patent
Kim et al.

(10) Patent No.: US 12,073,043 B2
(45) Date of Patent: Aug. 27, 2024

(54) ELECTRONIC DEVICE AND METHOD FOR DETECTING TOUCH INPUT THEREOF

(71) Applicant: SAMSUNG ELECTRONICS CO., LTD., Suwon-si (KR)

(72) Inventors: Seonghun Kim, Suwon-si (KR); Bongjun Ko, Suwon-si (KR); Ganghyun Goo, Suwon-si (KR); Jinwan An, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/086,391

(22) Filed: Dec. 21, 2022

(65) Prior Publication Data

US 2023/0168769 A1   Jun. 1, 2023

Related U.S. Application Data

(63) Continuation of application No. PCT/KR2022/017486, filed on Nov. 8, 2022.

(30) Foreign Application Priority Data

Nov. 29, 2021 (KR) .......................... 10-2021-0167616
Mar. 3, 2022 (KR) .......................... 10-2022-0027729

(51) Int. Cl.
*G06F 3/041* (2006.01)
*G06F 1/16* (2006.01)
*G06F 3/044* (2006.01)

(52) U.S. Cl.
CPC ........ *G06F 3/04166* (2019.05); *G06F 1/1652* (2013.01); *G06F 3/044* (2013.01); *G06F 2203/04102* (2013.01)

(58) Field of Classification Search
None
See application file for complete search history.

(56) References Cited

U.S. PATENT DOCUMENTS 9,927,936 B2   3/2018   Kang et al.
10,481,720 B2  11/2019   Hong et al.
(Continued)

FOREIGN PATENT DOCUMENTS

JP   2000-047806 A   2/2000
JP       7086293 B2   6/2022
(Continued)

OTHER PUBLICATIONS

International Search Report (PCT/ISA/210) issued Feb. 16, 2023 by the International Searching Authority in counterpart International Patent Application No. PCT/KR2022/017486.
(Continued)

*Primary Examiner* — Ifedayo B Iluyomade
(74) *Attorney, Agent, or Firm* — Sughrue Mion, PLLC

(57) ABSTRACT

An electronic device includes a first display panel that detects a touch input; a driving circuit electrically connected to the first display panel and that transfers at least one driving signal for measuring a touch signal to the first display panel; and a processor connected to the driving circuit, wherein the processor is configured to: display a screen by activating a first area which is at least a part of areas of the first display panel; control the driving circuit to measure the touch signal in the first area based on a first period; detect a first event related to a change in an activated area of the areas of the first display panel to a second area; change the first period to a second period different from the first period, based on the first event; and measure the touch signal in the second area based on the second period.

19 Claims, 12 Drawing Sheets

(56) References Cited

U.S. PATENT DOCUMENTS

| | | |
|---|---|---|
| 10,761,633 B2 | 9/2020 | Kang et al. |
| 10,908,719 B2 | 2/2021 | Jun et al. |
| 11,169,642 B2 | 11/2021 | Hong et al. |
| 11,209,949 B2 | 12/2021 | Ko et al. |
| 11,216,115 B2 | 1/2022 | Lee et al. |
| 2006/0267959 A1 | 11/2006 | Goto et al. |
| 2011/0084857 A1 | 4/2011 | Marino et al. |
| 2016/0041684 A1 | 2/2016 | Rhee et al. |
| 2016/0147350 A1 | 5/2016 | Kida et al. |
| 2019/0261519 A1* | 8/2019 | Park .................. G06F 1/1677 |
| 2021/0141491 A1* | 5/2021 | Gogte ................ G06F 3/0446 |

FOREIGN PATENT DOCUMENTS

| | | |
|---|---|---|
| KR | 10-2006-0125558 A | 12/2006 |
| KR | 10-2012-0095376 A | 8/2012 |
| KR | 10-2016-0019187 A | 2/2016 |
| KR | 10-2016-0127281 A | 11/2016 |
| KR | 10-1690941 B1 | 12/2016 |
| KR | 10-2017-0079639 A | 7/2017 |
| KR | 10-2019-0019723 A | 2/2019 |
| KR | 10-2019-0114945 A | 10/2019 |
| KR | 10-2020-0052725 A | 5/2020 |
| KR | 10-2021-0100939 A | 8/2021 |

OTHER PUBLICATIONS

Written Opinion (PCT/ISA/237) issued Feb. 16, 2023 by the International Searching Authority in counterpart International Patent Application No. PCT/KR2022/017486.

\* cited by examiner

ELECTRONIC DEVICE AND METHOD FOR DETECTING TOUCH INPUT THEREOF

CROSS-REFERENCE TO THE RELATED APPLICATIONS

This application is a bypass continuation of International Application No. PCT/KR2022/017486, filed on Nov. 8, 2022, in the Korean Intellectual Property Office, which claims priority from Korean Application No. 10-2021-0167616, filed on Nov. 29, 2021, and Korean Application No. 10-2022-0027729, filed on Mar. 3, 2022, both filed in the Korean Intellectual Property Office, the contents of which are herein incorporated by reference in their entireties.

BACKGROUND

1. Technical Field

Various embodiments of the present disclosure relate to an electronic device, for example, a method of controlling detection of a touch input by an electronic device including a touch screen panel.

2. Background Art

Electronic devices including touch screens have been actively introduced. An electronic device may display a screen including objects on the touch screen. A user may touch one point on the touch screen with a finger or a stylus pen, and the electronic device may detect the location of the touch on the touch screen. The electronic device may perform a function related to an object corresponding to the detected location, and accordingly, a user-friendly user interface which allows the user to control the electronic device through a simple touch may be provided.

A touch panel included in the touch screen may include a plurality of electrodes. The electrodes may be conductors and thus mutual capacitance may be formed between the electrodes. For example, when the touch panel is implemented in a capacitive type, the electronic device may apply a driving signal to at least one electrode, that is, a driving electrode of the touch panel, and driving electrodes may form an electric field. Other electrodes may output electric signals on the basis of the electric field formed by the driving electrodes. Meanwhile, when the user places his/her finger near at least one electrode, the size of the electric signal output from the at least one electrode located near the finger may be changed. The electronic device may detect a change in mutual capacitance on the basis of the changed size and detect the location of the touch on the basis of electrodes of which mutual capacitance is changed.

Alternatively, the electronic device may measure self-capacitance for each electrode. The electronic device may determine the location of the touch on the basis of the measured self-capacitance or determine information other than the touch identified on the basis of mutual capacitance.

SUMMARY

In the case of a current touch input measurement scheme, there is no problem in the conventional situation in which the number of electrodes are equally maintained, but, in a situation in which the number of electrodes of a screen which should be managed such as a stretchable (slidable) display or a flexible display increases or decreases, the corresponding change should be supported, and a method of smoothly measuring a touch input within a predetermined entire time when the number of electrodes is changed is needed.

An electronic device according to various embodiments of the present disclosure includes a first display panel configured to detect a touch input, a driving circuit electrically connected to the first display panel and configured to transfer at least one driving signal for measuring a touch signal to the first display panel, and a processor operatively connected to the driving circuit. The processor is configured to display a screen by activating a first area which is at least a part of areas of the first display panel; control the driving circuit to measure a touch signal in the first area based on a first period; detect a first event related to a change in an activated area of the areas of the first display panel to a second area; change the first period to a second period different from the first period, based on the first event; and measure a touch signal in the second area based on the second period.

According to various embodiments, it is possible to actively secure a uniform touch input measurement result in accordance with various state changes of a display panel and guarantee reliability of a touch display panel.

BRIEF DESCRIPTION OF THE DRAWINGS

In connection with description of the drawings, the same or similar reference numerals can be used for the same or similar elements.

DETAILED DESCRIPTION

Figure 1:
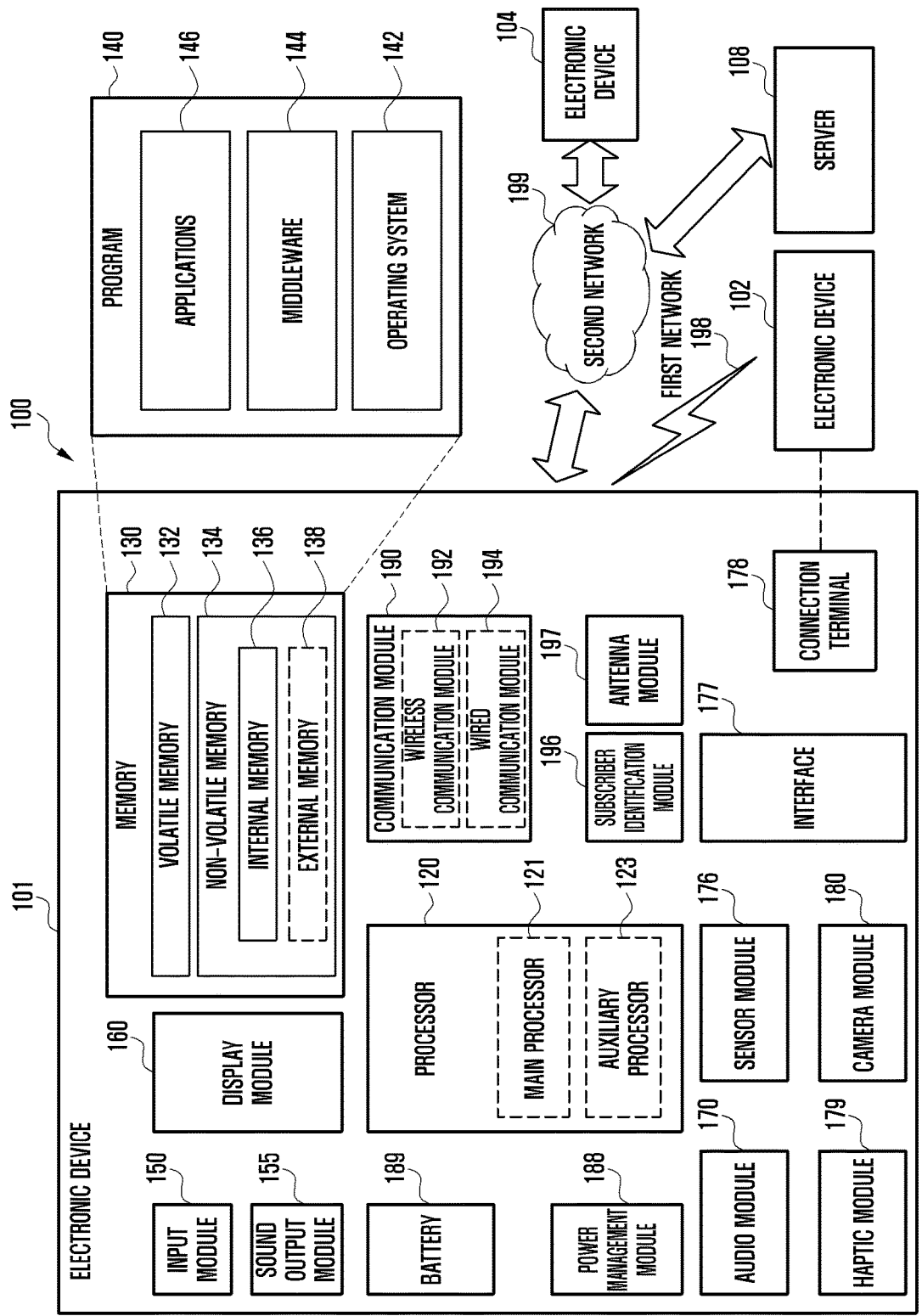
FIG. 1 is a block diagram of an electronic device within a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
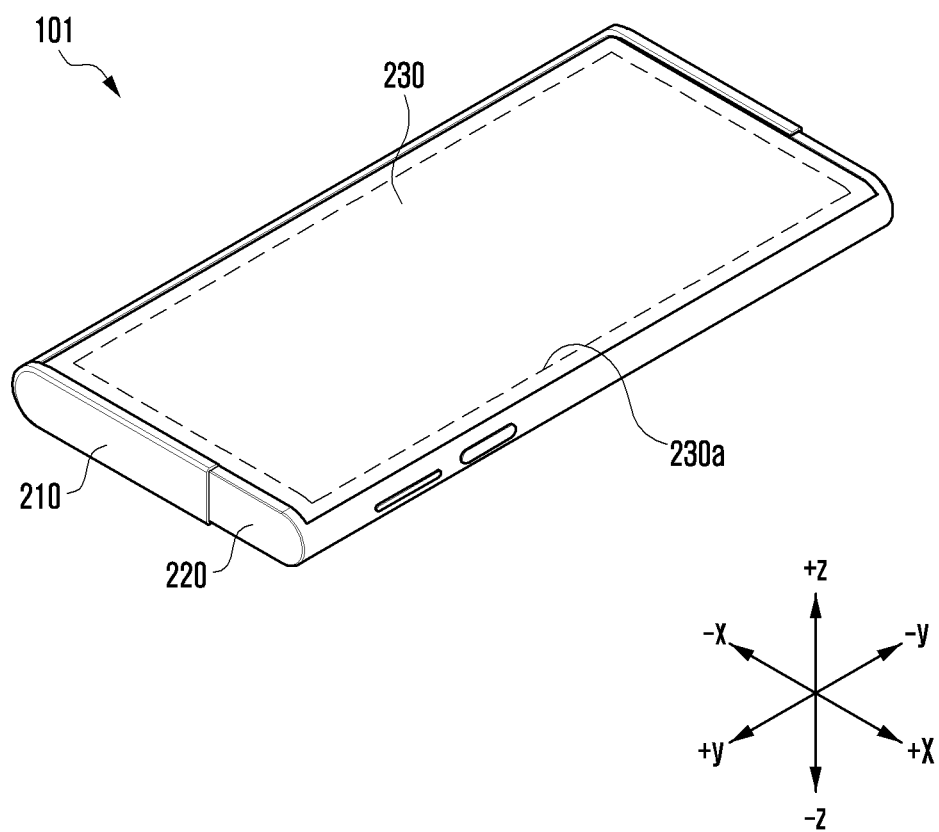
FIG. 2 is a perspective view of the electronic device according to various embodiments.

FIG. 2 is a perspective view of the electronic device according to various embodiments.

Figure 3:
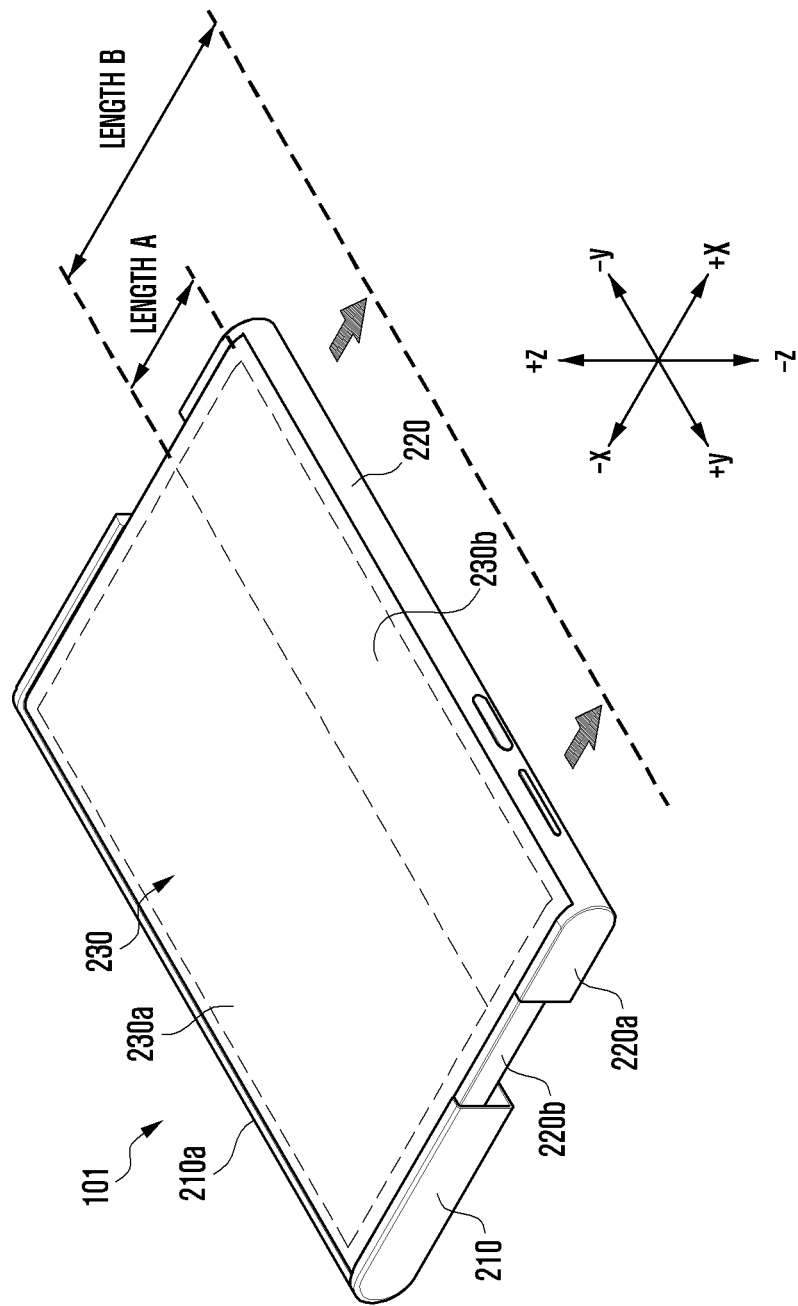
FIG. 3 is a perspective view of the electronic device according to various embodiments.

FIG. 3 is a perspective view of the electronic device according to various embodiments.

FIG. 2 is a perspective view illustrating a first state (e.g., a closed state or a roll-in state) of the electronic device 101.

FIG. 3 is a perspective view illustrating a second state (e.g., open state or a roll-out state) of the electronic device 101.

Referring to FIGS. 2 and 3, the electronic device 101 according to various embodiments may include a first housing 210 and a second housing 220. According to an embodiment, the second housing 220 may move in a predetermined direction, for example, a first direction (+X direction) from the first housing 210. For example, the second housing 220 may slide and move in the first direction (+X direction) by a predetermined distance from the first housing 210. According to an embodiment, the second housing 220 may go and return from one part of the first housing 210 within a predetermined distance range in the first direction (+X direction).

In various embodiments of the present disclosure, a state in which the second housing 220 slides and moves from the first housing 210 in the first direction (+X direction) may be defined as a second state (e.g., an expanded state or a slide-out state) of the electronic device 101. In various embodiments of the present disclosure, the second state of the electronic device 101 may be defined as a state in which a second part 230b of a display (e.g., a first display panel 230) is visually exposed to the outside.

In various embodiments of the present disclosure, a state in which the second housing 220 slides and moves in a direction towards the first housing 210, for example, a second direction (−X direction) opposed to the first direction (+X direction) may be defined as a first state (e.g., a contracted state or a slide-in state) of the electronic device 101. In various embodiments of the present disclosure, the first state of the electronic device 101 may be defined as a state in which the second part 230b of the first display panel 230 is not visually exposed to the outside.

In various embodiments, the first state may be referred to as a first shape, and the second state may be referred to as a second shape. For example, the first shape may include a normal state, a contracted state, or a closed state, and the second shape may include an open state. Further, in an embodiment, the electronic device 101 may make a third state (e.g., a middle state) between the first state and the second state. For example, the third state may be referred to as a third shape, and the third shape may include a free stop state.

In mutual switching of the electronic device 101 between the second state and/or the first state, the electronic device 101 according to various embodiments of the present disclosure may be manually switched by the control of the user or may be automatically switched through a driving module disposed within the first housing 210 or the second housing 220. According to an embodiment, an operation of the driving module may be triggered on the basis of a user input. According to an embodiment, a user input for triggering the operation of the driving module may include a touch input, a force touch input, and/or a gesture input through the first display panel 230. In another embodiment, the user input for triggering the operation of the driving module may include a voice input or an input of a physical button of the first housing 210 or the second housing 220 exposed to the outside. According to an embodiment, the driving module may be driven in a semiautomatic type such that the operation thereof is performed when the manual control of the user by external force is detected.

According to an embodiment, the electronic device 101 may be referred to as a "slidable electronic device" as the second housing 220 is designed to slide and move or a "rollable electronic device" as at least a part of the first display panel 230 is designed to be rolled into the second housing 220 (or the first housing 210) on the basis of the slide movement of the second housing 220.

According to an embodiment, in the electronic device 101, the second housing 200 may be coupled to the first housing 210 to be at least partially slidable and movable from the first housing 210. According to an embodiment, the coupling form between the first housing 210 and the second housing 220 is not limited to the form and coupling illustrated in FIGS. 2 and 3, and may be implemented by combination and/or coupling of other shapes or components.

According to an embodiment, the first housing 210 of the electronic device 101 may include a first side member 210a surrounding another side surface of the electronic device 101.

According to an embodiment, the second housing 220 of the electronic device 101 may include side members surrounding one side surface of the electronic device 101. According to an embodiment, the side members of the second housing 220 may include a second side member 220a, always visually exposed to the outside in the second state and the first state of the electronic device 101 without being inserted into the inside of the first housing 210, and a third side member 220b inserted into or withdrawn from an inner space of the first housing 210 through one end of the second housing 220.

According to an embodiment, the third side member 220b of the second housing 220 may not be visually exposed to the outside in the first state but may be visually exposed to the outside in the second state.

According to an embodiment, the first display panel 230 may be disposed to be visually exposed to the outside through a front direction (e.g., +Z direction) of each of the first housing 210 and the second housing 220. According to an embodiment, a display area of the first display panel 230 may be defined to include a first part 230a and a second part 230b.

According to an embodiment, the first part 230a of the first display panel 230 may be a display area fixedly and visually exposed to the outside regardless of the second state or the first state of the electronic device 101. For example, the first part 230a of the first display panel 230 may be fixed without movement regardless of slide movement of the second housing 220.

According to an embodiment, the second part 230b of the first display panel 230 is a display area expanded from one end of the first part 230a and may be inserted into the inner space of the second housing 220 or withdrawn to the outside from the inner space of the second housing 220 according to the slide movement of the second housing 220. According to an embodiment, a hole (not shown) from which or into which the second part 230b of the first display panel 230 is withdrawn or inserted may be disposed to be adjacent to a lateral side in the +X direction of the second housing 220. For example, the second part 230b of the first display panel 230 may be withdrawn from or inserted into a boundary part in the +X direction of the second housing 220.

According to an embodiment, the second part 230b of the first display panel 230 may be withdrawn from the inner space of the second housing 220 to the outside in the second state and visually exposed to the outside. According to an embodiment, the second part 230b of the first display panel 230 may be withdrawn to the outside by a length corresponding to a withdrawn length of the second housing 220. For example, the second part 230b may be withdrawn to the outside by the length A in accordance with the withdrawn length of the second housing 220. When the second housing 220 is maximally withdrawn, the second part 230b may be withdrawn by the length B. According to an embodiment, the second part 230b of the first display panel 230 may be inserted into the inner space of the second housing 220 in the first state and may not be visually exposed to the outside.

According to an embodiment, the first display panel 230 may include a flexible display. For example, the first part 230a of the first display panel 230 may include a flexible display and may be inserted into the inner space of the second housing 220 in the first state, or the second part 230b of the first display panel 230 may include a flexible display and may be inserted into the inner space of the second housing 220 in the first state.

According to an embodiment, with respect to a display area of the first display panel 230, only the first part 230a of the first display panel 230 may be visually exposed to the outside in the first state.

According to an embodiment, with respect to a display area of the first display panel 230, the first part 230a and the second part 230b of the first display panel 230 may be visually exposed to the outside in the second state.

According to various embodiments, the electronic device 101 may include a sensor module and/or a camera module.

According to an embodiment, the sensor module may be disposed below the first display panel 230 (e.g., the −Z direction from the first display panel 230) and detect an external environment on the basis of information (e.g., light) received through the first display panel 230. According to an embodiment, the sensor module may include at least one of a receiver, a proximity sensor, an ultrasonic sensor, a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, a motor encoder, or an indicator. According to an embodiment, at least some sensor modules of the electronic device 101 may be visually exposed to the outside through some areas of the first display panel 230.

The electronic device (e.g., the electronic device 101 of FIG. 2) according to various embodiments may include a housing structure (e.g., the first housing 210 and the second housing 220 of FIG. 2) and the first display panel 230 corresponding to a display (e.g., the first display panel 230) supported by the housing structure and having a display area of which the size is controlled by movement of at least a part of the housing structure in a first direction, the display area including a first part (e.g., the first part 230a of FIG. 3) fixedly exposed to the outside regardless of movement of at least a part of the housing structure in the first direction and a second part (e.g., the second part 230b of FIG. 3) extended from one end of the first part 230a and withdrawn from an inner space of the housing structure according to movement of at least a part of the housing structure to be exposed to the outside according to movement of at least a part of the housing structure.

Figure 4:
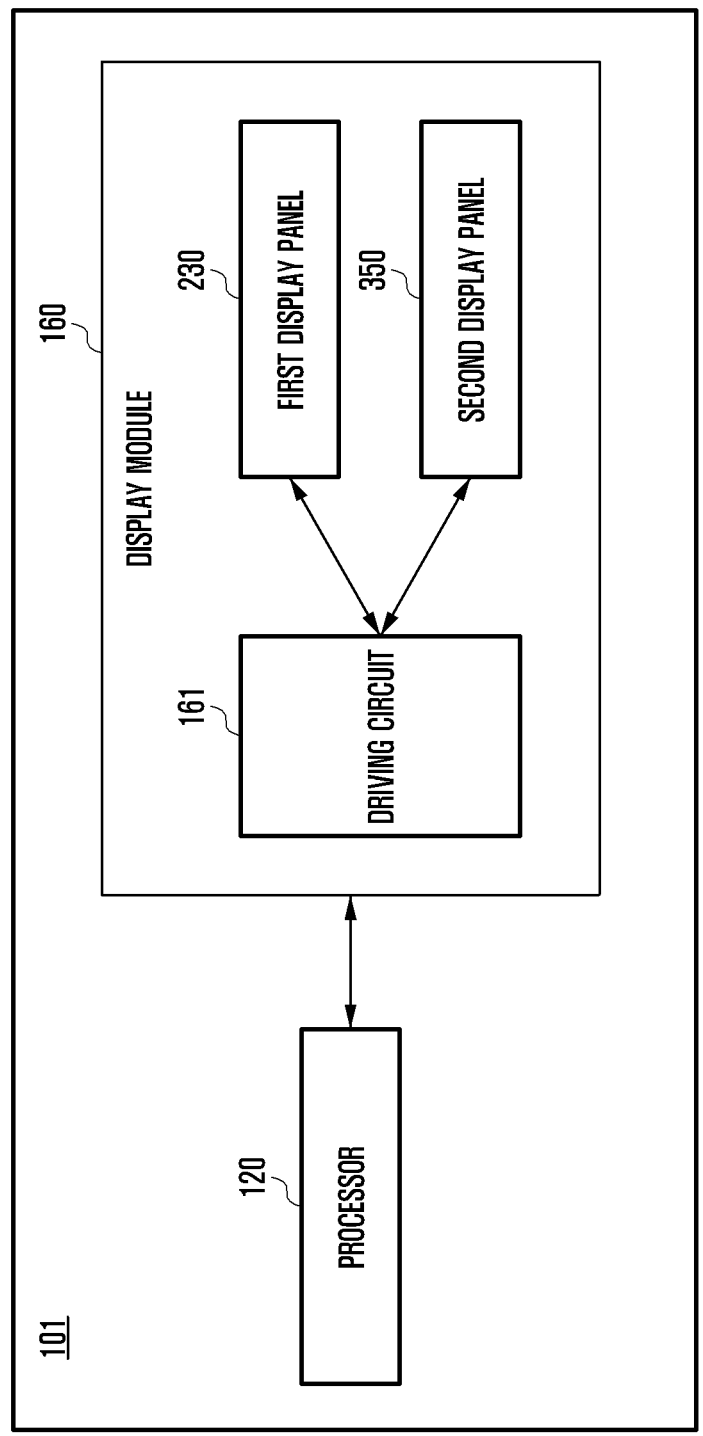
FIG. 4 is a block diagram of the electronic device according to various embodiments.

FIG. 4 is a block diagram of an electronic device according to various embodiments.

Referring to FIG. 4, the electronic device 101 may include a processor 120 (e.g., the processor 120 of FIG. 1) and a display module 160 (the display module 160 of FIG. 1). The electronic device 101 may include at least some of the elements and/or the functions of the electronic device 101 of FIG. 1.

According to various embodiments, the display module 160 may include a driving circuit 161, a first display panel 230 (e.g., the first display panel 230 of FIG. 2), and a second display panel 350.

According to various embodiments, the first display panel 230 may visually provide information to the outside of the electronic device 101. According to an embodiment, the first display panel 230 may include a touch sensor configured to detect a touch. According to an embodiment, the first display panel 230 may include a plurality of electrodes (e.g., conductive coils) and, when a voltage is applied to a transmission (TX) electrode (e.g., a first conductive coil) of the plurality of electrodes, form mutual capacitance with a reception (RX) electrode (e.g., a second conductive coil).

According to various embodiments, the second display panel 350 may visually provide information to the outside of the electronic device 101. According to an embodiment, the second display panel 350 may include a touch sensor configured to detect a touch. According to an embodiment, the second display panel 350 may include a plurality of electrodes (e.g., conductive coils) and, when a voltage is applied to a TX electrode (e.g., a first conductive coil) of the plurality of electrodes, form mutual capacitance with an RX electrode (e.g., a second conductive coil).

According to various embodiments, the driving circuit 161 may apply a driving signal to a display (e.g., the first display panel 230 and/or the second display panel 350) and receive a response signal of the driving signal from the display (e.g., the first display panel 230 and/or the second display panel 350). According to an embodiment, the driving signal may be a signal (e.g., a first driving signal) for detecting a touch input by controlling a display panel. For example, the driving circuit 161 may apply the first driving signal to at least one transmission electrode (TX electrode) included in the display panel (e.g., the first display panel 230 and/or the second display panel 350) and measure a change in the signal from at least one reception electrode (TX electrode), and the driving circuit 161 may acquire information on an input location on the display panel by processing the measurement result. The method of measuring the mutual capacitance is only an example and there is no limitation on the measurement method. Alternatively, the operation in which the driving circuit 161 detects the input location may mean that the driving circuit 161 measures self capacitance (or a change) of at least one electrode included in the display panel. The driving circuit 161 may provide the driving signal to at least one electrode included in the display panel and identify charges accumulated in a capacitor corresponding to the electrodes, so as to measure self capacitance of at least one electrode. The method of measuring the self capacitance is only an example and there is no limitation on the measurement method. According to an embodiment, the driving circuit 161 may apply a driving signal (e.g., voltage) to some electrodes (e.g., first conductive coils) of the display panel and identify an amount of charges of other electrodes (e.g., second conductive coils). According to an embodiment, the driving circuit 161 may control the display panel to detect a touch input or a hovering input for a specific location of the display panel. For example, driving circuit 161 may detect the touch input or the hovering input by measuring a change in a signal (e.g., voltage, an amount of light, resistance, or an amount of charges) for the specific location of the display panel. The driving circuit 161 may provide information on the detected touch input or hovering input (e.g., location, size, pressure, or time) to the processor 120. According to an embodiment, at least a portion of the touch circuit (e.g., the driving circuit 161) may be included as the part of the driving circuit 161 or the display panel or as the part of another element (e.g., the auxiliary processor 123 of FIG. 1) disposed at the outside of the display module 160

According to various embodiments, the processor 120 may process calculations or data related to the control and/or communication of respective elements of the electronic device 101. The processor 120 may include at least some of the elements and/or functions of the processor 120 of FIG. 1. The processor 120 may be operatively, electrically, and/or functionally connected to elements of the electronic device 101 such as the display module 160. There is no limitation on the type and/or amount of the operations, calculations, and data processing which can be performed by the processor 120. As merely an example, the present disclosure describes a method of driving the electronic device 101 and elements and functions of the processor 120 related to an operation of performing the method.

According to various embodiments, the processor 120 may activate at least some areas (e.g., the first area) of the display panel (the first display panel 230 or the second display panel 350). According to an embodiment, the processor 120 may display the screen of the electronic device 101 through the activated area of the display panel. According to an embodiment, the first area may include an area of the display (e.g., the first display panel 230) of the electronic device 101 exposed to the outside. For example, in the case of the electronic device 101 of FIG. 3, a part exposed to the outside among a first part (e.g., the first part 230a of FIG. 3) and a second part (e.g., the second part 230b of FIG. 3) of the first display panel 230 may be included in the first area.

According to various embodiments, the processor 120 may measure a touch input signal on the display panel. Measurement of the touch signal may include measurement of the location of the touch input on the display panel. According to an embodiment, the processor 120 may simultaneously or sequentially measure touch signals for predetermined locations on the display panel. Methods of measuring the touch signal may include a capacitive method, an ultrasonic method, and an infrared method, but are not limited to one thereof. In the present disclosure, description is made on the capacitive method for convenience of description. According to an embodiment, the processor 120 may measure touch signals for respective nodes formed by a plurality of electrodes (e.g., conductive coils), which cross each other, included in the display panel. For example, the processor 120 may apply a voltage to a plurality of first conductive coils and receive a value obtained by measuring an amount of charge of a plurality of second conductive coils disposed to cross the first conductive coils. The processor 120 may measure the touch signal by measuring a change in the amount of charge of the second conductive coils. According to an embodiment, the processor 120 may measure the touch signal based on a same amount of time with respect to all of the nodes within the first area 710. For example, the processor 120 may measure the touch signal on the basis of a first period for each node. The processor 120 may measure the touch signal of each node during the first period. According to an embodiment, the processor 120 may measure the touch signal over the entire first area within a predetermined time. The processor 120 may determine the first period on the basis of a time designated to the entire first area 710 and the number of all nodes corresponding to the first area 710. According to an embodiment, the processor 120 may determine the first period on the basis of the size of the first area 710. Respective nodes may be disposed to be uniformly distributed to the display panel, and the processor 120 may determine the number of all nodes and/or the first period corresponding to the first area on the basis of the size of the first area.

According to various embodiments, the processor 120 may detect a first event. The event may include reception of a signal related to a change in the activated area of the display panel. According to an embodiment, the processor 120 may detect the first event on the basis of whether the activated area of the display panel is changed. According to an embodiment, the processor 120 may detect the first event on the basis of a change in the withdrawn length of the second housing (e.g., the second housing 220 of FIG. 3). According to an embodiment, when the electronic device 101 includes a plurality of displays (e.g., the first display panel 230 and the second display panel 350), the processor 120 may detect the first event on the basis of the change in the activated display.

According to various embodiments, the processor 120 may determine a second period for measuring the touch signal on the basis of the first event. According to an embodiment, the activated area of the display panel may be changed according to the first event. For example, the activated area of the display panel may be changed from the first area to a second area when the first event is generated. According to an embodiment, the processor 120 may determine the second period on the basis of a predetermined time to measure the touch signal for the entire second area and the number of all nodes corresponding to the second area. The predetermined time to measure the touch signal for the entire second area may be the same as the predetermined time for the first area. According to an embodiment, the processor 120 may determine the second period on the basis of the size of the second area. Respective nodes may be disposed to be uniformly distributed to the display panel, and the processor 120 may determine the number of all nodes and/or the second period corresponding to the second area on the basis of the size of the second area.

According to various embodiments, the processor 120 may change the first period to the second period and measure the touch signal. According to an embodiment, the processor 120 may measure the touch signals for respective nodes formed by a plurality of electrodes (e.g., conductive coils), which cross each other, included in the display panel. For example, the processor 120 may apply a voltage to a plurality of first conductive coils and receive a value obtained by measuring an amount of charges of a plurality of second conductive coils disposed to cross the first conductive coils from the driving circuit 161. The processor 120 may measure the touch signal by measuring a change in the amount of charges of the second conductive coils. According to an embodiment, the processor 120 may measure the touch signal based on a same amount of time with respect to all of the nodes within the second area. For example, the processor 120 may measure the touch signal on the basis of the second period for each node. According to an embodiment, when a frame rate of the display panel is changed, the processor 120 may change the touch signal measurement period from the first period to the second period. The processor 120 may measure the touch signal for each node on the basis of the second period and identify the location of the touch signal on the basis of the measurement result.

Figure 5:
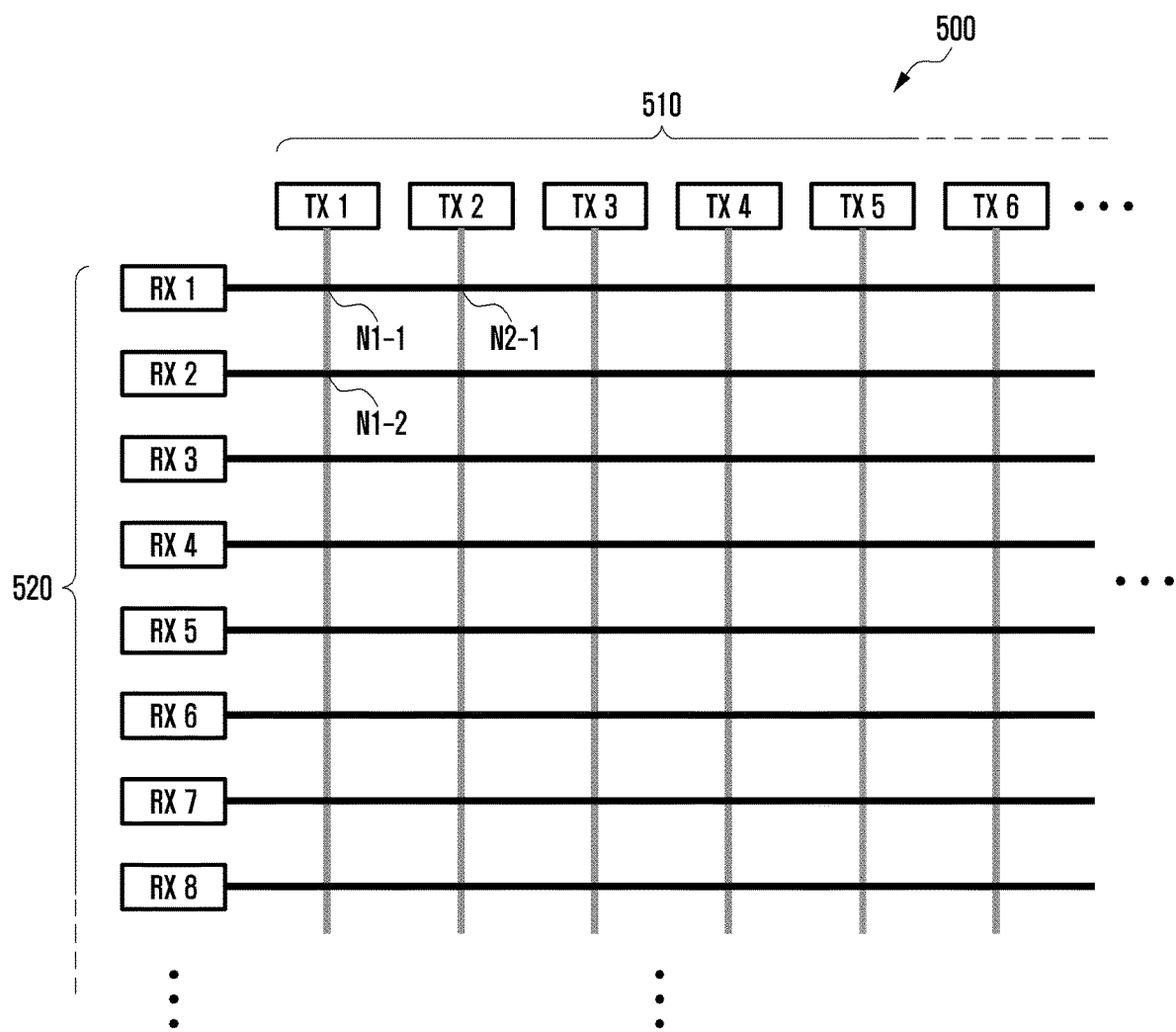
FIG. 5 illustrates a display panel of the electronic device according to various embodiments.

FIG. 5 illustrates a display panel of the electronic device according to various embodiments.

Referring to FIG. 5, a display panel 500 (e.g., the first display panel 230 or the second display panel 350 of FIG. 4) may include a plurality of electrodes. The plurality of electrodes may include conductive coils. The display panel 500 may include a plurality of first conductive coils 510 and a plurality of second conductive coils 520. The plurality of first conductive coils 510 may be disposed to cross the plurality of second conductive coils 520 at one point, respectively. The plurality of first conductive coils 510 may be disposed to be substantially parallel to each other, and the plurality of second conductive coils 520 may be disposed to be substantially parallel to each other. According to an embodiment, one of the first conductive coils 510 and one of the second conductive coils 520 may cross each other to form one node. For example, a node N1-1 may be formed at a point at which a coil TX1, which is one of the plurality of first conductive coils 510, and a coil RX1, which is one of the plurality of second conductive coils 520, cross each other; a node N2-1 may be formed through cross of a coil TX2 and the coil RX1; and a node N1-2 may be formed through cross of the coil TX1 and a coil RX2. According to an embodiment, the display panel 500 may include nodes corresponding to the product of a total number of plurality of first conductive coils 510 and a total number of plurality of second conductive coils 520. The processor (e.g., the processor 120 of FIG. 4) of the electronic device (e.g., the electronic device 101 of FIG. 4) may control the driving circuit (e.g., the driving circuit 161 of FIG. 4) to apply the driving signal (e.g., voltage) to the first conductive coil corresponding to one of the plurality of nodes, read a change in the amount of charges of the second conductive coil corresponding to the corresponding node, and measure the touch signal of the corresponding node. The electronic device 101 may measure the touch signal of each node by allocating a predetermined period for each predetermined node. According to an embodiment, the plurality of first conductive coils 510 may be disposed to be substantially parallel to each other at equivalent intervals. According to an embodiment, the plurality of second conductive coils 520 may be disposed to be substantially parallel to each other at equivalent intervals. According to an embodiment, the plurality of nodes may be disposed at regular intervals with adjacent nodes and may be uniformly distributed to the display panel 500.

Figure 6:
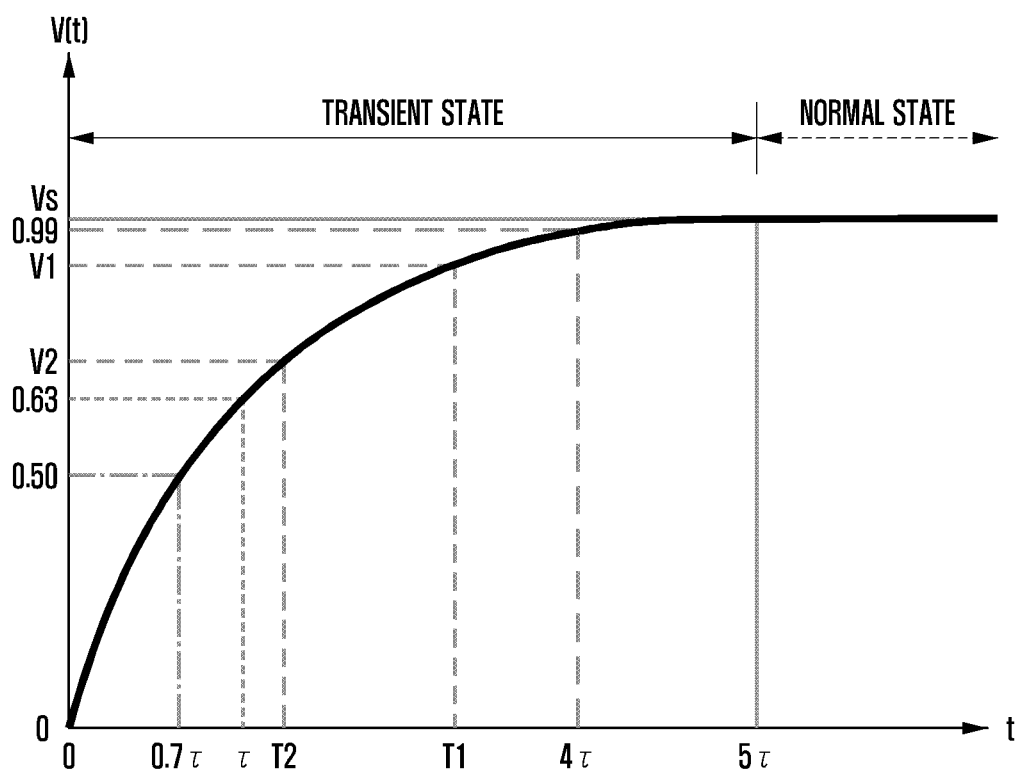
FIG. 6 is a graph showing resistor-capacitor (RC) circuit characteristics of conductive coils of a display according to various embodiments.

FIG. 6 is a graph illustrating characteristics of an RC circuit of the conductive coil of the display according to various embodiments.

Referring to FIG. 6, the graph of FIG. 6 shows a charging voltage of the conductive coil according to the time when the voltage is applied to the conductive coil. According to various embodiments, an amount of charges may be calculated on the basis of a voltage value of the conductive coil corresponding to the node when the touch signal is measured for each node (e.g., each of the plurality of nodes of FIG. 5). According to an embodiment, the processor (e.g., the processor 120 of FIG. 4) may calculate the amount of charges when the charging voltage reaches a peak state, that is, on the basis of a saturation voltage value. According to an embodiment, when the touch signal is measured on the basis of the first period (T1), the processor 120 may apply the voltage to first conductive coils (e.g., the first conductive coils 510 of FIG. 5) during a first period. In this case, the processor 120 may calculate the amount of charges on the basis of a ratio of the saturation voltage value to a charging voltage value (V1) corresponding to the time of the first period (T1). According to an embodiment, when the touch signal is measured for a second period (T2), the processor 120 may apply the voltage to second conductive coils (e.g., the second conductive coils 520 of FIG. 5) during the second period. In this case, the processor 120 may calculate the amount of charges on the basis of a ratio of the saturation voltage value to a charging voltage value (V2) corresponding to the time of the second period (T2). According to an embodiment, the processor 120 may calculate the saturation voltage value on the basis of a time constant ($\tau$). The time constant ($\tau$) may be a unique value determined according to RC characteristics of the conductive coils. The processor 120 may calculate a saturation voltage value (Vs) on the basis of the time constant ($\tau$) and the measurement voltage (e.g., charging voltage value V1 or charging voltage value V2) at the actual application time (e.g., first period T1 or second period T2).

According to various embodiments, the processor 120 may calibrate a time constant ($\tau$) and a saturation voltage (Vs). The processor 120 may acquire an actual time constant (τ) and saturation voltage (Vs) through calibration. According to an embodiment, when a first event is detected, the processor 120 may calibrate the time constant (τ) and the saturation voltage (Vs). According to an embodiment, the processor 120 may measure the charging voltage value V1 and the charging voltage value V2 for time period T1 and time period T2 by controlling the driving circuit 161 and substitute the same into Equation 1 below to calculate the time constant (τ) and the saturation voltage (Vs).

$$v(t) = 1 - e^{-\frac{t}{RC}} = 1 - e^{-\frac{t}{\tau}}, \ t \geq 0 \quad \text{[Equation 1]}$$

In Equation 1, e denotes a natural constant, t denotes a voltage application time, R denotes resistance of a conductive coil, and C denotes capacitance, the time constant (τ) may be expressed by the product of R and C, and the saturation voltage (Vs) may be expressed by a reaching charging voltage when the voltage is applied for a time of 5 τ.

Figure 7:
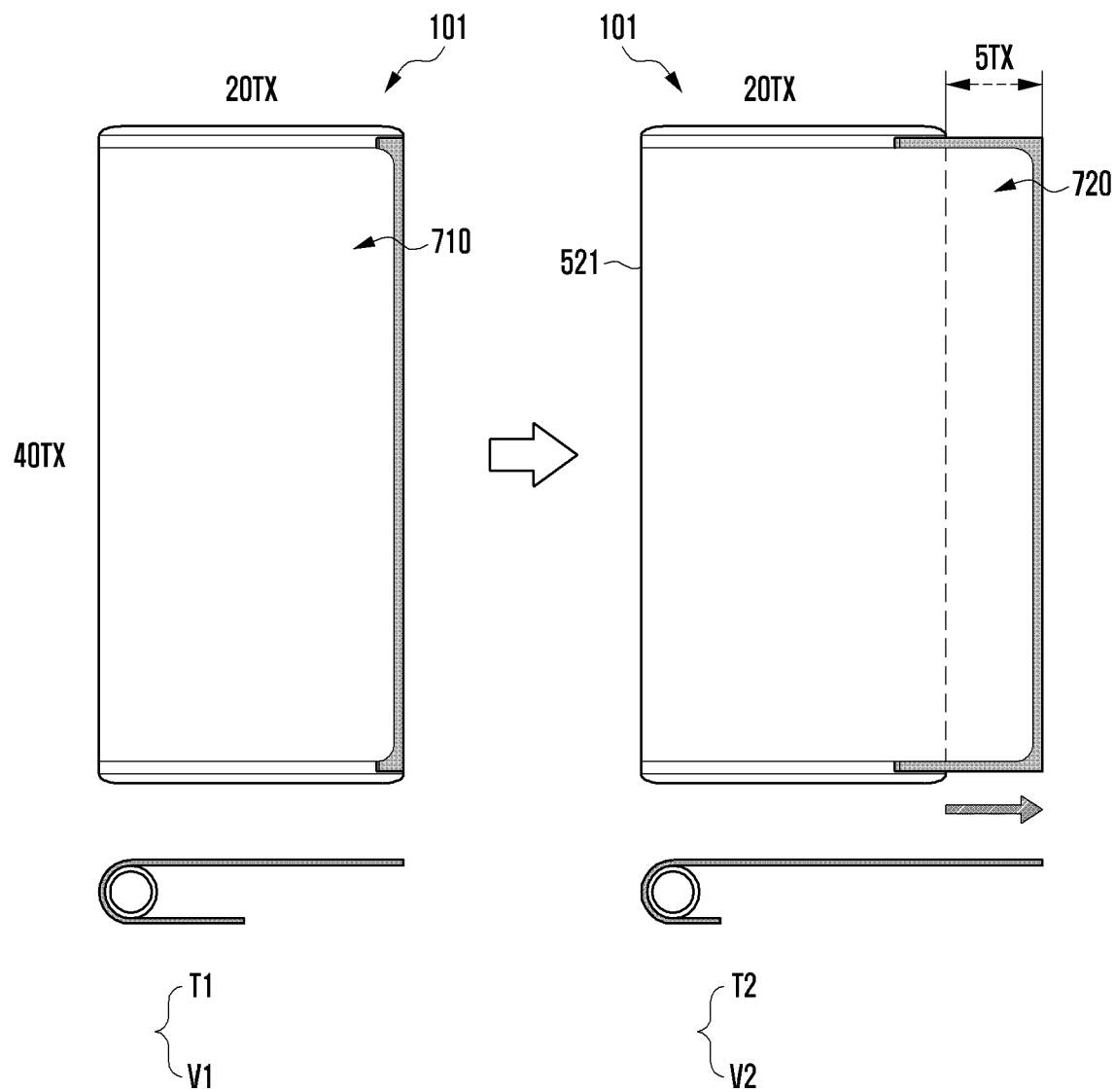
FIG. 7 illustrates a change in a measurement period of a touch signal by the electronic device according to various embodiments.

FIG. 7 illustrates a change in a measurement period of a touch signal by the electronic device according to various embodiments.

According to various embodiments, the electronic device 101 may activate at least some areas (e.g., a first area 710) of the display panel (e.g., the first display panel 230 or the second display panel 350). According to an embodiment, the electronic device 101 may display the screen of the electronic device 101 through the activated first area 710 of the display panel. According to an embodiment, the first area 710 may include an area of the display (e.g., the first display panel 230 of FIG. 2) of the electronic device 101 exposed to the outside. For example, in the case of the electronic device 101 of FIG. 3, a part exposed to the outside among a first part (e.g., the first part 230*a* of FIG. 3) and a second part (e.g., the second part 230*b* of FIG. 3) of the first display panel 230 may be included in the first area 710.

According to various embodiments, the electronic device 101 may measure a touch input signal on the display panel. Measurement of the touch signal may include measurement of the location of the touch input on the display panel. According to an embodiment, the electronic device 101 may simultaneously or sequentially measure touch signals for predetermined locations on the display panel. Methods of measuring the touch signal may include a resistive method, a capacitive method, an ultrasonic method, and an infrared method, but are not limited to one thereof. In the present disclosure, the description is made on the capacitive method for convenience of description. According to an embodiment, the electronic device 101 may measure touch signals for respective nodes formed by a plurality of electrodes (e.g., conductive coils), which cross each other, included in the display panel. For example, the electronic device 101 may apply a voltage to a plurality of first conductive coils and receive a value obtained by measuring an amount of charge of a plurality of second conductive coils disposed to cross the first conductive coils from the driving circuit 161. The electronic device 101 may measure the touch signal by measuring a change in the amount of charge of the second conductive coils. According to an embodiment, the electronic device 101 may measure the touch signal based on a same amount of time with respect to all of the nodes within the first area 710. For example, the electronic device 101 may measure the touch signal on the basis of a first period (T1) for each node. The electronic device 101 may measure the touch signal of each node during the first period (T1).

According to an embodiment, the electronic device 101 may measure the touch signal over the entire first area 710 within a predetermined time. The electronic device 101 may determine the first period (T1) on the basis of a time designated to the entire first area 710 and the number of all nodes corresponding to the first area 710. According to an embodiment, the electronic device 101 may determine the first period (T1) on the basis of the size of the first area 710. Respective nodes may be disposed to be uniformly distributed to the display panel, and the electronic device 101 may determine the number of all nodes/or the first period (T1) corresponding to the first area 710 on the basis of the size of the first area 710. Referring to FIG. 7, TX electrodes (e.g., first conductive coils) corresponding to the first area 710 may be a total of 20 and RX electrodes (e.g., second conductive coils) may be a total of 40. In this case, the number of all nodes may be 800 corresponding to the number of intersections of TX electrodes and RX electrodes. The electronic device 101 may determine the first period (T1) on the basis of the number of nodes being 800.

According to various embodiments, the electronic device 101 may detect a first event. The first event may include reception of a signal related to a change in an activated panel of the display panel. According to an embodiment, the electronic device 101 may detect the first event on the basis of the change in the activated area of the display panel. According to an embodiment, the electronic device 101 may detect the first event on the basis of a change in the withdrawn length of the second housing (e.g., the second housing 220 of FIG. 3). According to an embodiment, when the electronic device 101 includes a plurality of displays (e.g., the first display panel 230 and the second display panel 350), the electronic device 101 may detect the first event on the basis of a change in the activated display. According to an embodiment, the electronic device 101 may detect withdrawal of the second housing (e.g., the second housing 220 of FIG. 3) as the first event. The description of the first event in FIG. 7 is made on the basis of an example of extension of the display panel, but is not limited thereto. For example, the first event may refer to the case in which the activated area of the display is reduced and/or the electronic device 101 may also detect the case in which the activated area of the display is changed to another area distinguished from the existing activated area (e.g., the first area 710) as the first event. According to an embodiment, the electronic device 101 may identify an increase or a decrease in the withdrawn length of the second housing (e.g., the second housing 220 of FIG. 3) and detect the first event on the basis of the identified increase or decrease of the withdrawn length.

According to various embodiments, the electronic device 101 may determine a second period (T2) for measuring a touch signal on the basis of the first event. According to an embodiment, the activated area of the display panel may be changed according to the first event. For example, the activated area of the display panel may be changed from the first area 710 to the second area 720 when the first event is generated. According to an embodiment, the electronic device 101 may determine the second period (T2) on the basis of a predetermined time to measure the touch signal for the entire second area 720 and the number of all nodes corresponding to the second area 720. The predetermined time to measure the touch signal for the entire second area 720 may be the same as the predetermined time for the first area 710. According to an embodiment, the electronic device 101 may determine the second period (T2) on the basis of the size of the second area 720. Respective nodes may be disposed to be uniformly distributed to the display panel, and the electronic device 101 may determine the number of all nodes and/or the second period (T2) corresponding to the second area 720 on the basis of the size of the second area 720. According to an embodiment, the electronic device 101 may detect the first event or determine the second period (T2) on the basis of a difference between sizes of the second area 720 and the first area 710. Referring to FIG. 7, TX electrodes (e.g., first conductive coils) corresponding to the second area 720 may be a total of 25, and RX electrodes (e.g., second conductive coils) may be a total of 40. In this case, the number of all nodes may be 1000 which is the number of intersections of TX electrodes and RX electrodes. The electronic device 101 may determine the second period (T2) on the basis of the number of nodes corresponding to 1000.

According to various embodiments, the electronic device 101 may change the first period (T1) to the second period (T2) and measure the touch signal. According to an embodiment, the electronic device 101 may measure the touch signals for respective nodes formed by a plurality of electrodes (e.g., conductive coils), which cross each other, included in the display panel. For example, the electronic device 101 may apply a voltage to a plurality of first conductive coils and receive a value obtained by measuring an amount of charges of a plurality of second conductive coils disposed to cross the first conductive coils from the driving circuit 161. The electronic device 101 may measure the touch signal by measuring a change in the amount of charges of the second conductive coils. According to an embodiment, the electronic device 101 may measure the touch signal based on a same amount of time with respect to all of the nodes within the second area 720. For example, the electronic device 101 may measure the touch signal on the basis of the second period (T2) for each node. According to an embodiment, when a frame rate of the display panel is changed, the electronic device 101 may change the touch signal measurement period from the first period (T1) to the second period (T2). The electronic device 101 may measure the touch signal for each node on the basis of the second period (T2) and identify the location of the touch signal on the basis of the measurement result.

Figure 8:
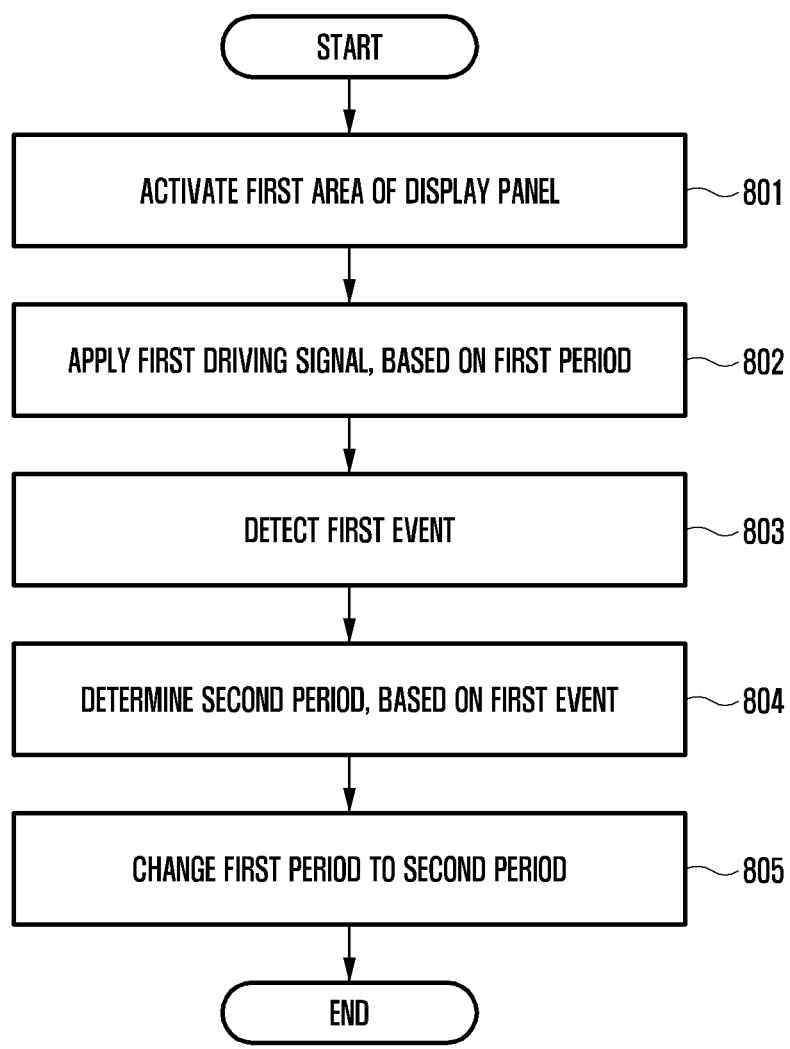
FIG. 8 is a flowchart illustrating an operation in which the electronic device changes the measurement period of the touch signal according to various embodiments.

FIG. 8 is a flowchart illustrating an operation in which the electronic device changes a measurement period of a touch signal according to various embodiments.

Referring to FIG. 8, the operation in which the electronic device (e.g., the electronic device 101 of FIG. 4) changes the measurement period of the touch signal may be understood as an operation of a processor (e.g., the processor 120 of FIG. 4) of the electronic device 101.

Referring to operation 801, the processor 120 may activate a first area of the display panel. According to various embodiments, the processor 120 may activate at least some areas (e.g., the first area) of the display panel (e.g., the first display panel 230 of FIG. 4). According to an embodiment, the processor 120 may display a screen of the electronic device 101 through the activated first area of the display panel. According to an embodiment, the first area may include an area of a display (e.g., the first display panel 230) of the electronic device 101 exposed to the outside. For example, in the case of the electronic device 101 of FIG. 3, a part exposed to the outside among a first part (e.g., the first part 230*a* of FIG. 3) and a second part (e.g., the second part 230*b* of FIG. 3) of the first display panel 230 may be included in the first area.

Referring to operation 802, the processor 120 may measure a touch signal on the basis of the first period. According to various embodiments, the processor 120 may measure a touch input signal on the display panel. Measurement of the touch signal may include measurement of the location of the touch input on the display panel. According to an embodiment, the processor 120 may simultaneously or sequentially measure touch signals for predetermined locations on the display panel. Methods of measuring the touch signal may include a resistive method, a capacitive method, an ultrasonic method, and an infrared method, but are not limited to one thereof. In the present disclosure, the description is made on the capacitive method for convenience of description. According to an embodiment, the processor 120 may measure touch signals for respective nodes formed by a plurality of electrodes (e.g., conductive coils), which cross each other, included in the display panel. For example, the processor 120 may apply a voltage to a plurality of first conductive coils and receive a value obtained by measuring an amount of charge of a plurality of second conductive coils disposed to cross the first conductive coils from the driving circuit 161. The processor 120 may measure the touch signal by measuring a change in the amount of charge of the second conductive coils. According to an embodiment, the processor 120 may measure the touch signal based on a same amount of time with respect to all of the nodes within the first area 710. For example, the processor 120 may measure the touch signal on the basis of a first period for each node. The processor 120 may measure the touch signal of each node during the first period. According to an embodiment, the processor 120 may measure the touch signal over the entire first area within a predetermined time. The processor 120 may determine the first period on the basis of a time designated to the entire first area 710 and the number of all nodes corresponding to the first area 710. According to an embodiment, the processor 120 may determine the first period on the basis of the size of the first area 710. Respective nodes may be disposed to be uniformly distributed to the display panel, and the processor 120 may determine the number of all nodes and/or the first period corresponding to the first area on the basis of the size of the first area.

Referring to operation 803, the processor 120 may detect a first event. The first event may include reception of a signal related to a change in an activated panel of the display panel. According to an embodiment, the processor 120 may detect the first event on the basis of the change in the activated area of the display panel. According to an embodiment, the processor 120 may detect the first event on the basis of a change in the withdrawn length of the second housing (e.g., the second housing 220 of FIG. 3). According to an embodiment, when the electronic device 101 includes a plurality of displays (e.g., the first display panel 230 and the second display panel 350), the processor 120 may detect the first event on the basis of a change in the activated display. The first event may include any event corresponding to a change in the activated area of the display. According to an embodiment, when the activated area of the display increases or decreases to be larger or smaller than the size of the first area and/or when the activated area of the display changes to another area distinguished from the existing activated area (first area), the processor 120 may detect the first event. According to an embodiment, the processor 120 may identify an increase or a decrease in the withdrawn length of the second housing (e.g., the second housing 220 of FIG. 3) and detect the first event on the basis of the identified increase or decrease in the withdrawn length. According to an embodiment, the processor 120 may identify the size of the activated area of the display in real time and/or periodically and compare the identified activated area of the display and the previously activated area. Accordingly, the processor 120 may detect the first event related to a change in the activated display area on the basis of the area comparison.

Referring to operation 804, the processor 120 may determine a second period for measuring the touch signal on the basis of the first event. According to an embodiment, the activated area of the display panel may be changed according to the first event. For example, the activated area of the display panel may be changed from the first area to a second area when the first event is generated. According to an embodiment, the processor 120 may determine the second period on the basis of a predetermined time to measure the touch signal for the entire second area and the number of all nodes corresponding to the second area. The predetermined time to measure the touch signal for the entire second area may be the same as the predetermined time for the first area. According to an embodiment, the processor 120 may determine the second period on the basis of the size of the second area. Respective nodes may be disposed to be uniformly distributed to the display panel, and the processor 120 may determine the number of all nodes and/or the second period corresponding to the second area on the basis of the size of the second area.

Referring to operation 805, the processor 120 may change the first period to the second period and measure the touch signal. According to an embodiment, the processor 120 may measure the touch signals for respective nodes formed by a plurality of electrodes (e.g., conductive coils), which cross each other, included in the display panel. For example, the processor 120 may apply a voltage to a plurality of first conductive coils and receive a value obtained by measuring an amount of charges of a plurality of second conductive coils disposed to cross the first conductive coils from the driving circuit 161. The processor 120 may measure the touch signal by measuring a change in the amount of charges of the second conductive coils. According to an embodiment, the processor 120 may measure the touch signal based on a same amount of time with respect to all of the nodes within the second area. For example, the processor 120 may measure the touch signal on the basis of the second period for each node. According to an embodiment, when a frame rate of the display panel is changed, the processor 120 may change the touch signal measurement period from the first period to the second period. The processor 120 may measure the touch signal for each node on the basis of the second period and identify the location of the touch signal on the basis of the measurement result.

Figure 9:
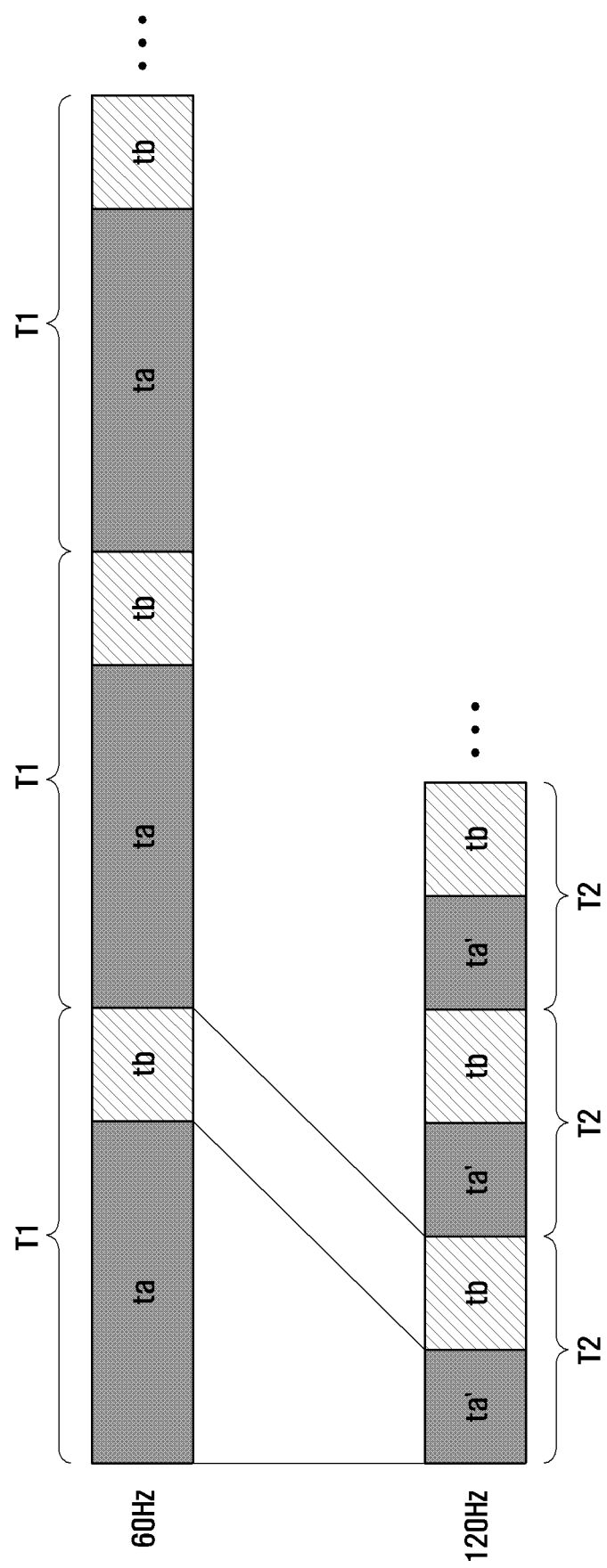
FIG. 9 illustrates a change in the measurement period of the touch signal when a frame rate of the electronic device is changed according to various embodiments.

FIG. 9 illustrates a change in a measurement period of a touch signal when a frame rate of the electronic device is changed according to various embodiments.

According to various embodiments, when a frame rate of a display panel is changed, the electronic device 101 (e.g., the electronic device 101 of FIG. 4) may change a touch signal measurement period from a first period to a second period. The electronic device 101 may measure a touch signal for each node on the basis of the second period and identify the location of the touch signal on the basis of the measurement result.

According to various embodiments, the touch signal measurement period (e.g., the first period (T1) or the second period (T2)) may have a value obtained by adding a measurement time (ta, ta') and a calculation time (tb). Referring to FIG. 9, when the frame rate of the display panel is changed form 60 Hz to 120 Hz, the electronic device 101 may change the signal measurement period from the first period (T1) to the second period (T2). According to an embodiment, the electronic device 101 may change the first period (T1) to the second period (T2) on the basis of a ratio between the frame rate before the change and the frame rate after the change. According to an embodiment, a ratio between the measurement time of the touch signal before the change and the measurement time thereof after the change may be different from a change rate between the first period (T1) and the second period (T2). For example, even when the measurement time increases or decreases, the time (e.g., calculation time) spent for calculating the measured signal by the electronic device 101 may be substantially the same. Accordingly, when the measurement period is changed, the actual measurement time may be changed at a larger rate than the measurement period change rate. Referring to FIG. 9, the period may be the first period (T1) that may have a value of about 16 ms when the frame rate of the display panel is 60 Hz, and the period may be the second period (T2) that may have a value of about 8 ms when the frame rate is 120 Hz. For example, when the calculate time (tb) has a value of about 3 ms, the measurement time (ta) which can be configured in the signal measurement period of the first period (T1) may be configured within a time of about 13 ms except for the calculation time (tb) (about 3 ms) from the first period (T1) (about 16 ms). That is, in the case corresponding to the example, the measurement period (ta) may have a maximum of about 13 ms in the first period (T1). Since the calculation time (tb) may have substantially the same value regardless of a change in the signal measurement period, the measurement time (ta') may be configured within a time of about 5 ms except for the calculation time (tb) (about 3 ms) from the second period (T2) (about 8 ms) when the signal measurement period is changed to the second period (T2). That is, in the case corresponding to the example, the measurement time (ta') may have a maximum of about 5 ms in the second period (T2). As described above, when the measurement period is changed, the actual measurement time may be changed at a larger rate than the measurement period change rate.

According to an embodiment, the electronic device 101 may change the measurement time (ta) distributed when the touch signal measurement period is changed in consideration of the calculation time (tb). The signal measurement period is not limited to the above-described first period (T1) and second period (T2) and may be a value configured on the basis of the activated area of the display panel. The electronic device 101 may change the signal measurement period to various values on the basis of the activated area of the display. According to an embodiment, the electronic device 101 may store a plurality of signal measurement period values (e.g., the first period, the second period, a third period, a fourth period, and the like) corresponding to respective sizes of the activated area of the display panel in a memory (e.g., the memory 130 of FIG. 1). According to an embodiment, the electronic device 101 may calculate the signal measurement period (second period (T2)) on the basis of the activated area of the display. According to an embodiment, the electronic device 101 may configure a value (e.g., the second period (T2)) corresponding to the current activated area as the signal measurement period among the plurality of signal measurement period values stored on the basis of the activated area of the display to change the value to the signal measurement period. According to an embodiment, the electronic device 101 may change the signal measurement period value (e.g., the second period (T2)) calculated on the basis of the activated area of the display as the signal measurement period.

Figure 10:
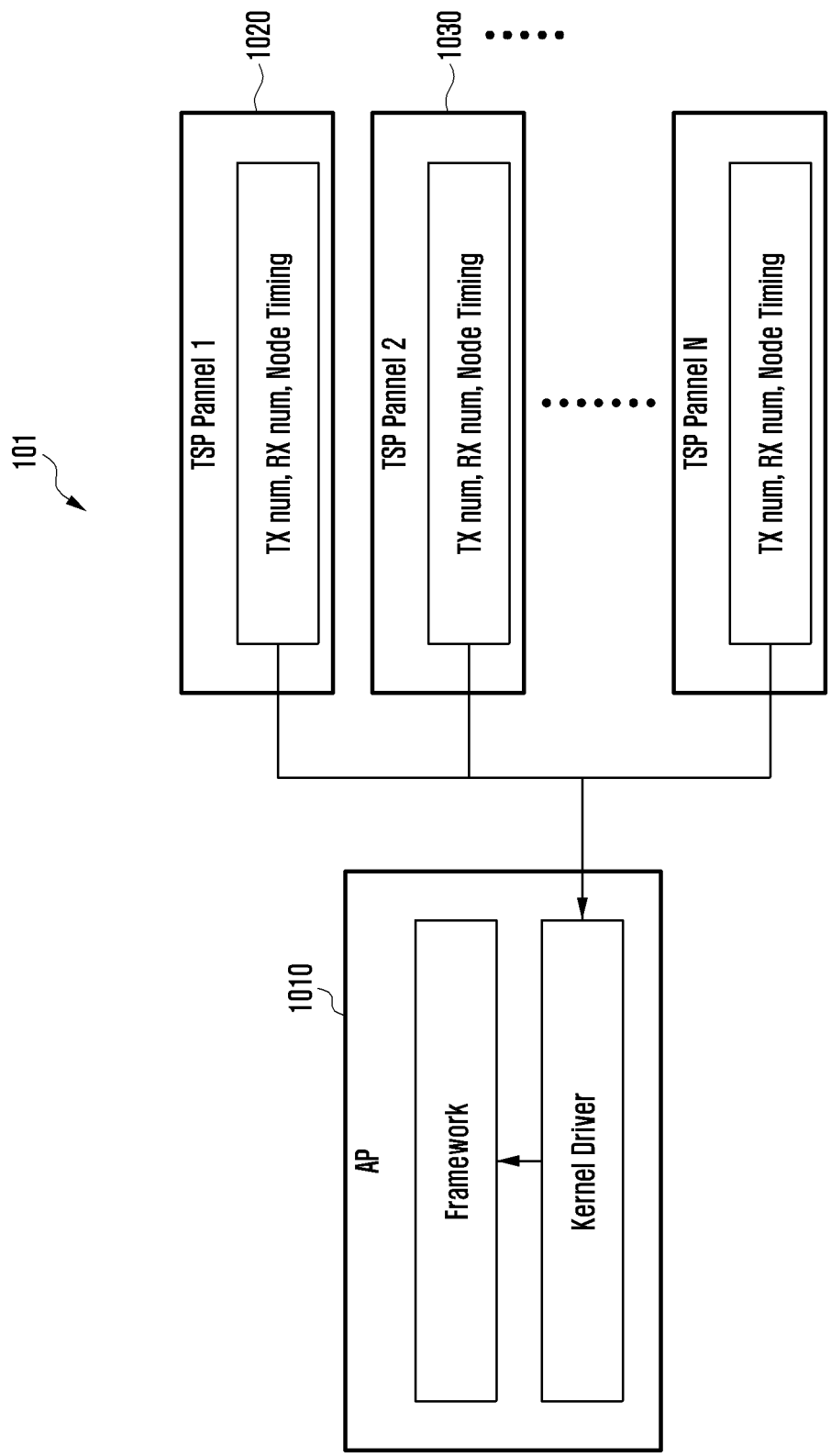
FIG. 10 is a block diagram of the electronic device according to various embodiments.

FIG. 10 is a block diagram of the electronic device according to various embodiments.

Referring to FIG. 10, the electronic device 101 may include an application processor (AP) 1010, touch screen panel (TSP) 1 1020, and/or TSP 2 1030 as functional functions. Each of the AP 1010, TSP 1 1020, and TSP 2 1030 may be implemented in the form of an integrated circuit (IC) as a functional module of the processor (e.g., the processor 120 of FIG. 4) of the electronic device 101 or may be implemented as data stored in the memory (e.g., the memory 130 of FIG. 1).

According to various embodiments, TSP 1 1020 and TSP 2 1030 may be implemented as functional modules of the first display panel and the second display panel, respectively. According to an embodiment, TSP 1 1020 may store information on the number of TX electrodes (TX num) and the number of RX electrodes (RX num) of the first display panel (e.g., the first display panel 230 of FIG. 4) and information on a measurement period distributed for each node (node timing). According to an embodiment, TSP 2 1030 may store information on the number of TX electrodes (TX num) and the number of RX electrodes (RX num) of the second display panel (e.g., the second display panel 350 of FIG. 4) and information on a measurement period distributed for each node (node timing).

According to an embodiment, each of TSP 1 and TSP 2 may transfer the information on the number of TX electrodes and the number of RX electrodes and the information on the measurement period for each node to the AP 1010 through a kernel driver and store the same in a framework.

According to an embodiment, when a change in the measurement period is needed (e.g., when the first event is detected), the framework may transmit information on TX and RX ranges which should be measured in each panel and application timing (measurement period). Accordingly, the IC of each panel (e.g., TSP 1 and TSP 2) may determine the measurement period for each node, calculate a time constant, and measure data.

Figure 11:
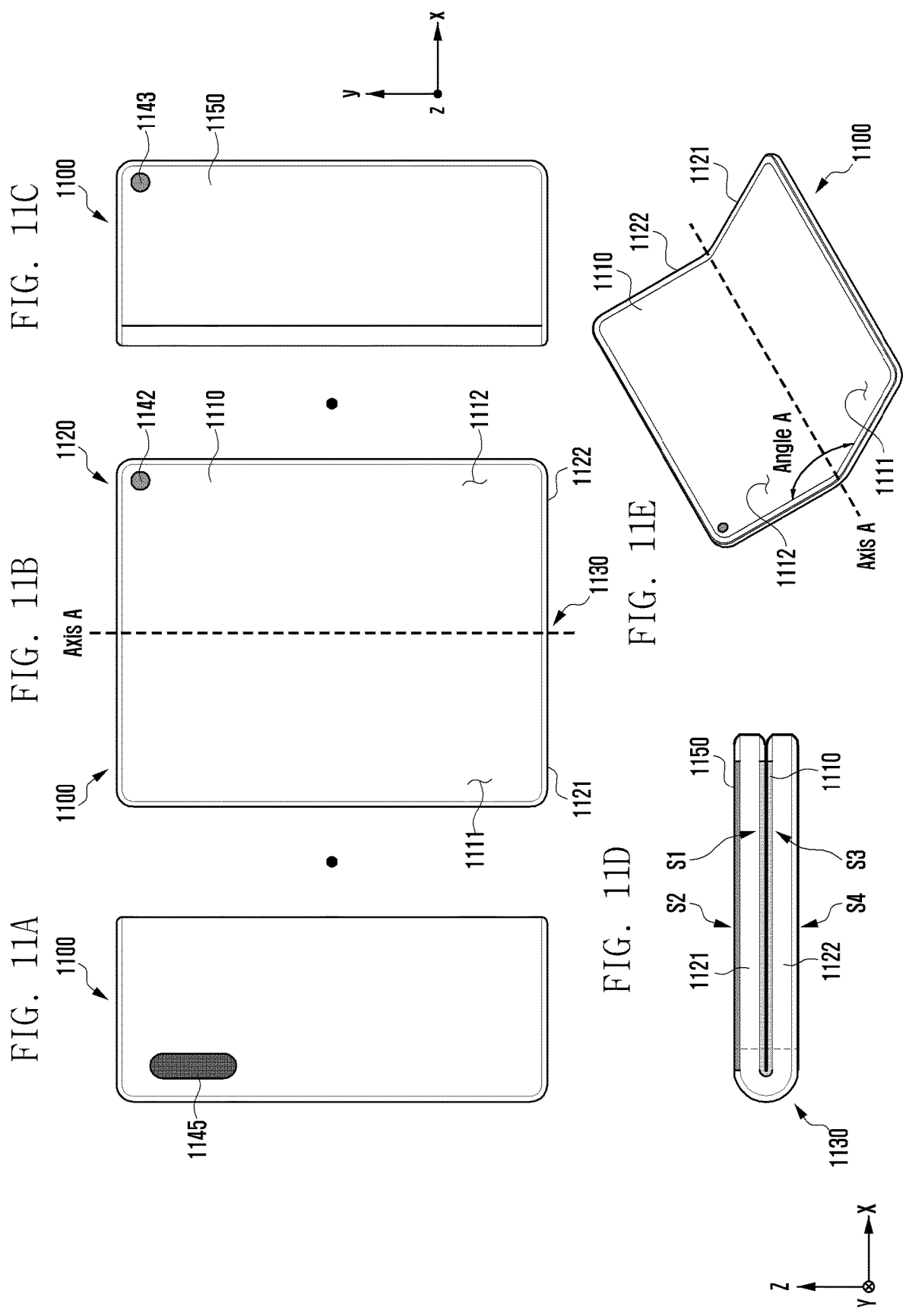
FIG. 11A is first view of the electronic device including a plurality of display panels in a folded state according to various embodiments.
FIG. 11B is a front view of the electronic device including the plurality of display panels in an unfolded state according to various embodiments.
FIG. 11C is a second view of the electronic device including a plurality of display panels in the folded state according to various embodiments.
FIG. 11D is a side view of the electronic device including the plurality of display panels in the folded state according to various embodiments.
FIG. 11E is a perspective view of the electronic device including the plurality of display panels in the unfolded state according to various embodiments.

FIG. 11A is first view of the electronic device including a plurality of display panels in a folded state according to various embodiments. FIG. 11B is a front view of the electronic device including the plurality of display panels in an unfolded state according to various embodiments. FIG. 11C is a second view of the electronic device including a plurality of display panels in the folded state according to various embodiments. FIG. 11D is a side view of the electronic device including the plurality of display panels in the folded state according to various embodiments. FIG. 11E is a perspective view of the electronic device including the plurality of display panels in the unfolded state according to various embodiments.

FIGS. 11A-E illustrates an example of a change in the structure and the form of the electronic device including a flexible display according to various embodiments.

Referring to FIGS. 11A-E, an electronic device 1100 (e.g., the electronic device 101 of FIG. 1) including a flexible display (e.g., a first display 1110) according to various embodiments may be a foldable electronic device. According to various embodiments, a first housing 1121, a second housing 1122, and/or a hinge part 1130 included in a housing structure 1120 of the electronic device 1100 may be included. For example, the first housing 1121 may include a first surface (S2) and a second surface (S2), and the second housing 1122 may include a third surface (S3) and a fourth surface (S4). For example, when the first display 1110 of the electronic device 1100 is folded with respect to an axis A, the first surface (S1) of the first housing 1121 may lie on the third surface (S3) of the second housing 1122 to face each other. Here, the case of the folded form of the electronic device 101 may include the case in which an angle (e.g., angle A) between the first surface (S1) of the first housing 1121 and the third surface (S3) of the second housing 1122 is a narrow angle (e.g., 0 to 5 degrees). The folded state may be a closed state (folded state or closed state) and may mean that the electronic device 1100 is completely folded. The first display 1110 may be divided into a first area 1111 and a second area 1112 which are physically divided areas, the first area may be located on the first surface (S1) of the first housing 1121, and the second area may be located on the third surface (S3) of the second housing 1122. The first housing 1121 and the second housing 1122 may be disposed in both sides from the folding axis (e.g., axis A) and may be totally symmetrical with respect to the folding axis.

According to various embodiments, the hinge part 1130 may be formed between the first housing 1121 and the second housing 1122, and thus the first housing 1121 and the second housing 1122 of the electronic device 1100 may be folded. According to an embodiment, the first housing 1121 and the second housing 1122 may be connected through the hinge part 1130. However, the housing structure in which the electronic device is disposed in left and right sides from the folding axis (e.g., axis A) is only an example, and may have housings disposed in up and down sides from the folding axis of the electronic device as illustrated in FIG. 3, which will be described below. According to an embodiment, the hinge part 1130 may be disposed along the axis A.

According to various embodiments, the housing structure 1120 of the electronic device 1100 may have a variable form. For example, the first housing 1121 and the second housing 1122 may move by being unfolded and folded with respect to the hinge part 1130. According to an embodiment, the first housing 1121 and the second housing 1122 may form a folding angle (e.g., angle A). According to various embodiments, the folding angle (e.g., angle A) may vary. For example, the angle A may have a size from about 0 degrees to about 180 degrees. In another example, the angle A may have a size from about 0 degrees to about 360 degrees. The angle (e.g., angle A) or distance between the first housing 1121 and the second housing 1122 may vary depending on the form thereof such as an unfolded form (or open form), a folded form (or closed form), or an intermediate form. For example, the unfolded form may be a flat state, opened state, or an open state. The state in which the first display 1110 of the electronic device 1100 is unfolded is a state in which the first housing 1121 and the second housing 1122 are disposed in parallel and may refer to a form in which the electronic device 1100 is completely unfolded. The unfolded state of the first display 1110 may be a state in which the angle A is about 180 degrees. In the state in which the electronic device 1100 is unfolded, the first surface (S1) of the first housing 1121 and the third surface (S3) of the second housing 1122 may be disposed to face substantially the same direction.

Among the forms of the first display of the electronic device 1100, the intermediate form (intermediate state) is a state in which the first housing 1121 and the second housing 1122 are disposed at a predetermined angle and may be an intermediate state from the folded state to the unfolded state. For example, the intermediate state may refer to a form in which the angel A has a predetermined angle (e.g., about 6 degrees to about 179 degrees).

According to an embodiment, the electronic device may include a second display 1150 (e.g., the display module 160 of FIG. 1) in at least some of the first housing 1121 and the second housing 1122. Referring to FIG. 2, the second display 1150 may be formed on at least some of the second surface (S2) of the first housing 1121 of the electronic device

1100. In another example, the second display 1150 may be disposed on the fourth surface (S4) of the second housing 1122, and may be formed in some areas or substantially the entire areas of the second surface (S2) of the first housing 1121 and the fourth surface (S4) of the second housing 1122. The second display 1150 may include at least some of the configurations and/or the functions of the display module 160 of FIG. 1.

According to various embodiments, the electronic device 1100 may include a sensor module and camera modules 1142, 1143, and 1145.

According to an embodiment, the sensor module may be disposed below the first display 1110 (e.g., the −Z direction from the first display 1110) and detect an external environment on the basis of information (e.g., light) received through the first display 1110. According to an embodiment, the sensor module may include at least one of a receiver, a proximity sensor, an ultrasonic sensor, a gesture sensor, a gyro sensor, an atmospheric pressure sensor, a magnetic sensor, an acceleration sensor, a grip sensor, a color sensor, an infrared (IR) sensor, a biometric sensor, a temperature sensor, and a humidity sensor. According to an embodiment, at least some sensor modules of the electronic device 1100 may be visually exposed to the outside through some areas of the first display 1110. According to an embodiment, the electronic device 1100 may detect a folding angle (e.g., angle A) through the sensor module.

According to an embodiment, the electronic device 1100 may include at least one sensor (e.g., the acceleration sensor, the gyro sensor, and/or the magnetic sensor) in each of the plurality of housings (e.g., the first housing 1121 and/or the second housing 1122). In another example, the electronic device 1100 may include the respective sensor (e.g., the acceleration sensor, the gyro sensor, and/or the magnetic sensor) only in one of the plurality of housings (e.g., the first housing 1121 and/or the second housing 1122).

Figure 12:
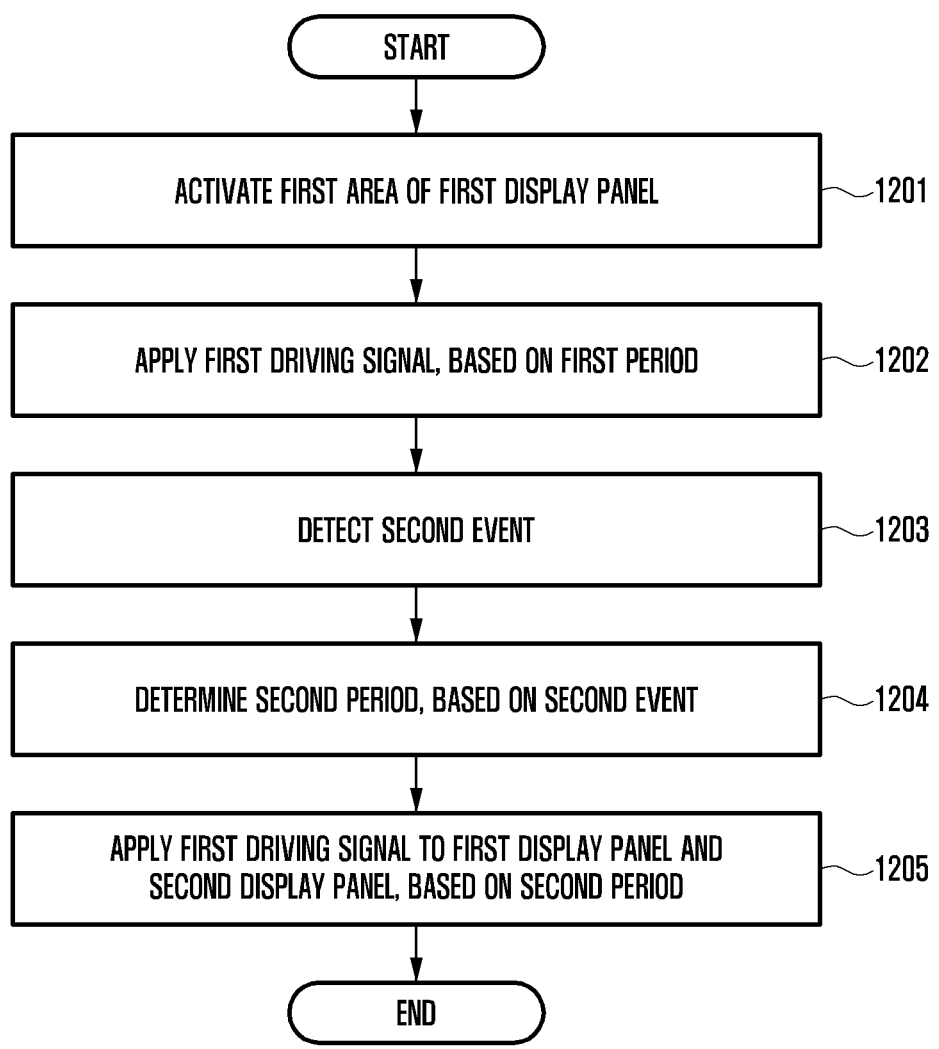
FIG. 12 is a flowchart illustrating an operation in which the electronic device, that includes a plurality of display panels, changes the measurement period of the touch signal according to various embodiments.

FIG. 12 is a flowchart illustrating an operation in which an electronic device including a plurality of display panels changes a measurement period of a touch signal according to various embodiments.

Referring to FIG. 12, the operation in which electronic device (e.g., the electronic device 101 of FIG. 4) changes the measurement period of the touch signal may be understood as the operation of the processor (e.g., the processor 120 of FIG. 4) of the electronic device 101.

Referring to operation 1201, the processor 120 may activate a first area of a first display panel (e.g., the first display panel 230 of FIG. 4). According to various embodiments, the processor 120 may activate at least some areas (e.g., the first area) of the first display panel 230. According to an embodiment, the processor 120 may display the screen of the electronic device 101 through the activated first area of the display panel. According to an embodiment, the first area may include an area of the display (e.g., the first display panel 230) of the electronic device 101 exposed to the outside.

According to various embodiments, the processor 120 may measure a touch input signal on the display panel. Measurement of the touch signal may include measurement of the location of the touch input on the display panel. According to an embodiment, the processor 120 may simultaneously or sequentially measure touch signals for predetermined locations on the display panel. Methods of measuring the touch signal may include a resistive method, a capacitive method, an ultrasonic method, and an infrared method, but are not limited to one thereof. In the present disclosure, the description is made on the capacitive method for convenience of description. According to an embodiment, the processor 120 may measure touch signals for respective nodes formed by a plurality of electrodes (e.g., conductive coils), which cross each other, included in the display panel. For example, the processor 120 may apply a voltage to a plurality of first conductive coils and receive a value obtained by measuring an amount of charge of a plurality of second conductive coils disposed to cross the first conductive coils from the driving circuit 161. The processor 120 may measure the touch signal by measuring a change in the amount of charge of the second conductive coils. According to an embodiment, the processor 120 may measure the touch signal based on a same amount of time with respect to all of the nodes within the first area 710. For example, the processor 120 may measure the touch signal on the basis of a first period for each node. The processor 120 may measure the touch signal of each node during the first period. According to an embodiment, the processor 120 may measure the touch signal over the entire first area within a predetermined time. The processor 120 may determine the first period on the basis of a time designated to the entire first area and the number of all nodes corresponding to the first area. According to an embodiment, the processor 120 may determine the first period on the basis of the size of the first area 710. Respective nodes may be disposed to be uniformly distributed to the display panel, and the processor 120 may determine the number of all nodes and/or the first period corresponding to the first area on the basis of the size of the first area.

According to various embodiments, the processor 120 may detect a second event. The second event may include reception of a signal related to a change in the activated area of the display panel. According to an embodiment, when the electronic device 101 includes a plurality of displays (e.g., the first display panel 230 and the second display panel 350), the processor 120 may detect the second event on the basis of the change in the activated display. For example, the processor 120 may detect the case in which the second display panel is also activated in the state in which the first display panel is activated as the second event. According to an embodiment, when the activated display panel switches from the first display panel to the second display panel, the processor 120 may detect the second event.

According to various embodiments, the processor 120 may determine a second period for measuring the touch signal on the basis of the second event. According to an embodiment, the activated area of the display panel may be changed according to the second event. For example, when the second event is generated, the activated area of the display panel may be changed from the first area to the second area. According to an embodiment, the processor 120 may determine the second period on the basis of a predetermined time to measure the touch signal for the entire second area and the number of all nodes corresponding to the second area. The predetermined time to measure the touch signal for the entire second area may be the same as the predetermined time for the first area. According to an embodiment, the processor 120 may determine the second period on the basis of the size of the second area. Respective nodes may be disposed to be uniformly distributed to the display panel, and the processor 120 may determine the number of all nodes and/or the second period corresponding to the second area on the basis of the size of the second area. According to an embodiment, when the plurality of display panels are activated, the processor 120 may determine the second period on the basis of the size of the entire areas of the activated displays. According to an embodiment, the processor 120 may determine the second period on the basis of the number of all nodes corresponding to all of the one or more activated display panels.

According to various embodiments, the processor 120 may change the first period to the second period and measure the touch signal. According to an embodiment, the processor 120 may measure the touch signals for respective nodes formed by a plurality of electrodes (e.g., conductive coils), which cross each other, included in the display panel. For example, the processor 120 may apply a voltage to a plurality of first conductive coils and receive a value obtained by measuring an amount of charges of a plurality of second conductive coils disposed to cross the first conductive coils from the driving circuit 161. The processor 120 may measure the touch signal by measuring a change in the amount of charges of the second conductive coils. According to an embodiment, the processor 120 may measure the touch signal based on a same amount of time with respect to all of the nodes within the second area. For example, the processor 120 may measure the touch signal on the basis of the second period for each node. According to an embodiment, when a frame rate of the display panel is changed, the processor 120 may change the touch signal measurement period from the first period to the second period. The processor 120 may measure the touch signal for each node on the basis of the second period and identify the location of the touch signal on the basis of the measurement result.

The electronic device according to various embodiments of the present disclosure may include a first display panel (e.g., 230 of FIG. 2) configured to detect a touch input, a driving circuit (e.g., 161 of FIG. 2) electrically connected to the first display panel and configured to transfer at least one driving signal for measuring a touch signal to the first display panel, and a processor (e.g., 120 of FIG. 2) operatively connected to the driving circuit, wherein the processor may be configured to display a screen by activating a first area (e.g., 710 of FIG. 7) which is at least a part of areas of the first display panel, control the driving circuit to measure the touch signal in the first area based on a first period (e.g., T1 of FIG. 9); detect a first event related to a change in an activated area of the areas of the first display panel to a second area (e.g., 720 of FIG. 7); change the first period to a second period (e.g., T2 of FIG. 9) different from the first period, based on the first event; and measure the a touch signal in the second area based on the second period.

The processor may be configured to identify a size of the first area, determine the first period, based on the size of the first area, identify a size of the second area, based on the first event, compare the size of the first area with the size of the second area to identify whether a size of the activated area of the first display panel is changed, and change the first period to the second period, based on whether the size of the activated area is changed.

The processor may be configured to determine the second period, based on the size of the activated area.

The first display panel may include a plurality of first conductive coils (e.g., 510 of FIG. 5) and a plurality of second conductive coils (e.g., 520 of FIG. 5) crossing the plurality of first conductive coils, the plurality of first conductive coils and the plurality of second conductive coils may form a plurality of nodes at points where the plurality of first conductive coils and the plurality of second conductive coils intersect, and the processor may be configured to measure the touch signal for each of the plurality of nodes.

The processor may be configured to measure the touch signal for each of the plurality of nodes corresponding to the first area during the first period.

The processor may be configured to identify a number of nodes corresponding to the second area, based on the first event, determine the second period, based on the number of nodes corresponding to the second area, and measure the touch signal for each of the nodes corresponding to the second area during the second period.

The electronic device may further include a memory configured to store data, wherein the memory may be configured to store information on a number of nodes corresponding to a predetermined area on the first display panel and a touch signal measurement period corresponding to the number of nodes, and the processor may be configured to identify the activated area of the first display panel and identify the touch signal measurement period, based on a number of nodes corresponding to the activated area.

The plurality of first conductive coils may correspond to a size of the first display panel and may be sequentially disposed to be substantially parallel to each other, and the plurality of second conductive coils may correspond to the size of the first display panel and may be sequentially disposed to be substantially parallel to each other.

The electronic device may further include a second display panel, wherein the driving circuit may be electrically connected to the second display panel and configured to transfer at least one driving signal for measuring the touch signal to the second display panel, and the processor may be configured to detect a second event related to activation of the second display panel, change the first period to a third period different from the first period on the basis of the second event, and measure touch signals on the first display panel and the second display panel, based on the third period.

The processor may be configured to determine the third period, based on the activated area of the first display panel and a size of an entire activated area of the second display panel.

The first display panel may include a first plurality of conductive coils and a first plurality of nodes formed by crossing of the first plurality of conductive coils, the second display panel may include a second plurality of conductive coils and a second plurality of nodes formed by crossing of the second plurality of conductive coils, and the processor may be configured to determine the second period, based on a total sum of numbers of the first plurality of nodes included in the first display panel and the second plurality of nodes included in the second display panel.

The electronic device may further include a housing structure including: a first housing; and a second housing connected to the first housing, wherein the second housing may be connected to the first housing such that at least a part of the second housing is configured to be slidably inserted into or withdrawn from the first housing, the first display panel may include a flexible display that is configured to be inserted or withdrawn according to movement of the second housing, and the processor may be configured to activate an area of the first display panel corresponding to the first housing and an area of the first display panel corresponding to a part of the second housing withdrawn from the first housing and detect the first event based on a withdrawn length of the second housing being changed.

The processor may be configured to determine the second period, based on the withdrawn length of the second housing.

The processor may be configured to apply a screen output signal to the first display panel, based on a first refresh rate; change the first refresh rate to a second refresh rate, based on identification of a signal related to a refresh rate change;

determine the second period, based on the second refresh rate; and change the first period to the second period.

A method of controlling detection of a touch signal by an electronic device including a first display panel configured to detect a touch input according to various embodiments of the present disclosure may include: an operation of displaying a screen by activating a first area which is at least a part of areas of the first display panel; an operation of controlling a driving circuit to measure the touch signal in the first area based on a first period; an operation of detecting a first event related to a change in an activated area of the areas of the first display panel to a second area; an operation of changing the first period to a second period different from the first period, based on the first event; and an operation of measuring the touch signal in the second area based on the second period.

The operation of measuring the touch signal, based on the first period may include: an operation of identifying a size of the first area; and an operation of determining the first period, based on the size of the first area, and the operation of changing the first period to the second period may include: an operation of identifying a size of the second area, based on the first event; an operation of comparing the size of the first area with the size of the second area to identify whether a size of the activated area of the first display panel is changed; and an operation of changing the first period to the second period, based on whether the size is changed.

The first display panel may include a plurality of first conductive coils and a plurality of second conductive coils disposed to cross the plurality of first conductive coils, the plurality of first conductive coils and the plurality of second conductive coils may form a plurality of nodes at points where the plurality of first conductive coils and the plurality of second conductive coils intersect, and the operation of measuring the touch signal may include an operation of measuring the touch signal for each of the plurality of nodes.

The operation of changing the first period to the second period may include an operation of identifying a number of nodes corresponding to the second area, based on the first event; an operation of determining the second period, based on the number of nodes corresponding to the second area; and an operation of measuring the touch signal for each of the nodes corresponding to the second area during the second period.

The electronic device may include the first display panel and a second display panel, and the method may further include: an operation of detecting a second event related to activation of the second display panel; an operation of changing the first period to a third period different from the first period, based on the second event; and an operation of measuring touch signals on the first display panel and the second display panel, based on the third period.

The processor may be configured to determine the third period, based on the activated area of the first display panel and a size of an entire activated area of the second display panel.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
a first display panel configured to detect a touch input;
a driving circuit electrically connected to the first display panel and configured to transfer at least one driving signal for measuring a touch signal to the first display panel; and
a processor operatively connected to the driving circuit, wherein the processor is configured to:
display a screen by activating a first area which is at least a part of areas of the first display panel;
while the first area is activated, control the driving circuit to measure the touch signal in the first area based on a first touch signal measurement period, wherein the first touch signal measurement period is determined based on a size of the first area;
detect a first event related to a change in an activated area of the first display panel from the first area to a second area;
in response to the first event, change the first touch signal measurement period to a second touch signal measurement period different from the first touch signal measurement period, based on a size of the second area; and
control the driving circuit to measure the touch signal in the second area based on the second touch signal measurement period.

2. The electronic device of claim 1, wherein the processor is configured to:
compare the size of the first area with the size of the second area to identify whether a size of the activated area of the first display panel is changed; and
change the first touch signal measurement period to the second touch signal measurement period, based on whether the size of the activated area is changed.

3. The electronic device of claim 1, wherein the first display panel comprises a plurality of first conductive coils and a plurality of second conductive coils crossing the plurality of first conductive coils,
wherein the plurality of first conductive coils and the plurality of second conductive coils form a plurality of nodes at points where the plurality of first conductive coils and the plurality of second conductive coils intersect, and
wherein the processor is configured to measure the touch signal for each of the plurality of nodes.

4. The electronic device of claim 3, wherein the processor is configured to measure the touch signal for each of the plurality of nodes corresponding to the first area during the first touch signal measurement period.

5. The electronic device of claim 3, wherein the processor is configured to:
identify a number of nodes corresponding to the second area, based on the first event;
determine the second touch signal measurement period, based on the number of nodes corresponding to the second area; and
measure the touch signal for each of the nodes corresponding to the second area during the second touch signal measurement period.

6. The electronic device of claim 3, further comprising a memory configured to store data,
wherein the memory is configured to store information on a number of nodes, corresponding to a predetermined area on the first display panel and the first touch signal measurement period, and
wherein the processor is configured to:
identify the activated area of the first display panel; and
identify the first touch signal measurement period, based on a number of nodes corresponding to the activated area.

7. The electronic device of claim 3, wherein the plurality of first conductive coils correspond to a size of the first display panel and are sequentially disposed to be parallel to each other, and
wherein the plurality of second conductive coils correspond to the size of the first display panel and are sequentially disposed to be parallel to each other.

8. The electronic device of claim 1, further comprising a second display panel,
wherein the driving circuit is electrically connected to the second display panel and configured to transfer at least one driving signal for measuring the touch signal to the second display panel, and
wherein the processor is configured to:
detect a second event related to activation of the second display panel;
change the first touch signal measurement period to a third touch signal measurement period different from the first touch signal measurement period, based on the second event; and
measure touch signals on the first display panel and the second display panel, based on the third touch signal measurement period.

9. The electronic device of claim 8, wherein the processor is configured to determine the third touch signal measurement period, based on the activated area of the first display panel and a size of an entire activated area of the second display panel.

10. The electronic device of claim 8, wherein the first display panel comprises a first plurality of conductive coils and a first plurality of nodes formed by crossing of the first plurality of conductive coils,
wherein the second display panel comprises a second plurality of conductive coils and a second plurality of nodes formed by crossing of the second plurality of conductive coils, and
wherein the processor is configured to determine the third touch signal measurement period, based on a total sum of numbers of the first plurality of nodes included in the first display panel and the second plurality of nodes included in the second display panel.

11. The electronic device of claim 1, further comprising a housing structure,
wherein the housing structure comprises:
a first housing; and
a second housing connected to the first housing, the second housing connected to the first housing such that at least a part of the second housing is configured to be slidably inserted into or withdrawn from the first housing,
wherein the first display panel comprises a flexible display that is configured to be inserted or withdrawn according to movement of the second housing, and
wherein the processor is configured to:
activate an area of the first display panel corresponding to the first housing and an area of the first display panel corresponding to a part of the second housing withdrawn from the first housing; and
detect the first event based on a withdrawn length of the second housing being changed.

12. The electronic device of claim 11, wherein the processor is configured to determine the second touch signal measurement period, based on the withdrawn length of the second housing.

13. The electronic device of claim 1, wherein the processor is configured to:
apply a screen output signal to the first display panel, based on a first refresh rate;
change the first refresh rate to a second refresh rate, based on identification of a signal related to a refresh rate change;
determine the second touch signal measurement period, based on the second refresh rate; and
change the first touch signal measurement period to the second touch signal measurement period.

14. A method of controlling detection of a touch signal by an electronic device including a first display panel configured to detect a touch input, the method comprising:
displaying a screen by activating a first area which is at least a part of areas of the first display panel;
controlling a driving circuit to measure the touch signal in the first area based on a first touch signal measurement period, wherein the first touch signal measurement period is determined based on a size of the first area;
detecting a first event related to a change in an activated area of the first display panel to from the first area to a second area;
in response to the first event, changing the first touch signal measurement period to a second touch signal measurement period different from the first touch signal measurement period, based on a size of the second area; and measuring the touch signal in the second area based on the second touch signal measurement period.

15. The method of claim 14, wherein changing of the first touch signal measurement period to the second touch signal measurement period comprises:
comparing the size of the first area with the size of the second area to identify whether a size of the activated area of the first display panel is changed; and
changing the first touch signal measurement period to the second touch signal measurement period, based on whether the size is changed.

16. The method of claim 14, wherein the first display panel includes a plurality of first conductive coils and a plurality of second conductive coils disposed to cross the plurality of first conductive coils,
wherein the plurality of first conductive coils and the plurality of second conductive coils form a plurality of nodes at points where the plurality of first conductive coils and the plurality of second conductive coils intersect, and
wherein the measuring of the touch signal comprises measuring the touch signal for each of the plurality of nodes.

17. The method of claim 16, wherein the changing of the first touch signal measurement period to the second touch signal measurement period comprises:
identifying a number of nodes corresponding to the second area, based on the first event;
determining the second touch signal measurement period, based on the number of nodes corresponding to the second area; and
measuring the touch signal for each of the nodes corresponding to the second area during the second touch signal measurement period.

18. The method of claim 14, wherein the electronic device includes the first display panel and a second display panel, and
wherein the method further comprises:
detecting a second event related to activation of the second display panel;
changing the first touch signal measurement period to a third period different from the first touch signal measurement period, based on the second event; and
measuring touch signals on the first display panel and the second display panel, based on the third period.

19. The method of claim 18, further comprising:
determining the third period, based on the activated area of the first display panel and a size of an entire activated area of the second display panel.

* * * * *